United States Patent
Henein et al.

(10) Patent No.: US 10,774,773 B2
(45) Date of Patent: Sep. 15, 2020

(54) AUTONOMOUS OPERATION OF ELECTRONICALLY CONTROLLED INTERNAL COMBUSTION ENGINES ON A VARIETY OF FUELS AND/OR OTHER VARIABILITIES USING ION CURRENT AND/OR OTHER COMBUSTION SENSORS

(75) Inventors: Naeim A. Henein, Grosse Pointe Farms, MI (US); Tamer H. Badawy, Detroit, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 446 days.

(21) Appl. No.: 13/981,840

(22) PCT Filed: Jan. 26, 2012

(86) PCT No.: PCT/US2012/022774
§ 371 (c)(1),
(2), (4) Date: Sep. 4, 2013

(87) PCT Pub. No.: WO2012/103368
PCT Pub. Date: Aug. 2, 2012

(65) Prior Publication Data
US 2014/0379242 A1 Dec. 25, 2014

Related U.S. Application Data

(60) Provisional application No. 61/437,246, filed on Jan. 28, 2011.

(51) Int. Cl.
*F02D 41/14* (2006.01)
*F02D 35/02* (2006.01)
(Continued)

(52) U.S. Cl.
CPC .......... *F02D 41/26* (2013.01); *F02D 19/061* (2013.01); *F02D 19/0652* (2013.01);
(Continued)

(58) Field of Classification Search
CPC .. F02D 35/021; F02D 41/146; F02D 41/1461; F02D 41/1462; F02D 41/1463;
(Continued)

(56) References Cited

U.S. PATENT DOCUMENTS

| 4,535,740 A | * | 8/1985 | Ma ........................ | F02P 5/1455 123/406.26 |
| 4,919,099 A | * | 4/1990 | Extance ................ | F02D 35/022 123/406.28 |

(Continued)

OTHER PUBLICATIONS

International Search Report, Serial No. PCT/US12/22774, dated May 11, 2012.

*Primary Examiner* — Erick R Solis
(74) *Attorney, Agent, or Firm* — Fishman Stewart PLLC

(57) ABSTRACT

A system and method to enable electronically controlled internal combustion engines to self-adjust parameters and operate properly on different fuels that have wide ranges of physical and chemical properties. Input from a sensor is utilized that gives a signal indicative of the combustion process. The ECU processes the signal and readjusts the engine operating parameters to achieve its operating goals.

25 Claims, 25 Drawing Sheets

(51) Int. Cl.
*F02P 5/152* (2006.01)
*F02D 41/26* (2006.01)
*F02D 41/00* (2006.01)
*F02D 19/06* (2006.01)
*F02D 29/02* (2006.01)
*F02D 41/40* (2006.01)
*F02P 19/02* (2006.01)
*F02P 5/15* (2006.01)
*F02P 17/12* (2006.01)

(52) U.S. Cl.
CPC ........... *F02D 29/02* (2013.01); *F02D 35/021* (2013.01); *F02D 35/022* (2013.01); *F02D 35/023* (2013.01); *F02D 41/0025* (2013.01); *F02D 41/1406* (2013.01); *F02D 41/1461* (2013.01); *F02D 41/1462* (2013.01); *F02D 41/1463* (2013.01); *F02D 41/1465* (2013.01); *F02P 5/1527* (2013.01); *F02D 41/0027* (2013.01); *F02D 41/40* (2013.01); *F02D 2700/07* (2013.01); *F02P 5/1502* (2013.01); *F02P 19/028* (2013.01); *F02P 2017/125* (2013.01); *F02P 2017/128* (2013.01); *Y02T 10/36* (2013.01)

(58) Field of Classification Search
CPC ..................... F02D 41/1464; F02D 41/1465; F02P 5/1527; F02P 2017/125; F02P 2017/128
USPC ........... 123/299, 304, 406.26, 406.3, 406.31, 123/575–577, 406.28, 435; 701/105
See application file for complete search history.

(56) References Cited

U.S. PATENT DOCUMENTS

| | | | | |
|---|---|---|---|---|
| 5,036,669 A * | 8/1991 | Earleson | ............... | F02D 35/021 123/239 |
| 5,050,556 A * | 9/1991 | Williams | ............... | F02D 35/022 123/406.28 |
| 5,983,862 A * | 11/1999 | Nishiyama | ............ | F02P 17/12 123/406.26 |
| 6,032,650 A * | 3/2000 | Rask | ................... | F02D 35/021 123/406.26 |
| 6,073,611 A * | 6/2000 | Ohuchi | ................ | F02D 35/021 123/1 A |
| 6,085,132 A | 7/2000 | Ishii et al. | | |
| 6,125,691 A * | 10/2000 | Hohner | ................ | F02D 35/021 73/114.67 |
| 6,901,328 B2 | 5/2005 | Damson et al. | | |
| 6,994,073 B2 * | 2/2006 | Tozzi | ...................... | F02P 9/007 123/143 B |
| 7,025,042 B2 * | 4/2006 | Gray, Jr. | ................... | F02B 1/12 123/435 |
| 7,779,808 B2 | 8/2010 | Kurotani et al. | | |
| 7,779,813 B2 * | 8/2010 | Hahn | .................... | F02D 35/021 123/305 |
| 7,806,100 B2 * | 10/2010 | Schnorbus | .............. | F02D 35/02 123/299 |
| 8,032,294 B2 * | 10/2011 | Loeffler | ................... | F02D 35/02 123/431 |
| 8,132,556 B2 * | 3/2012 | Glugla | .................. | F02D 35/021 123/406.11 |
| 8,267,065 B2 * | 9/2012 | Kurtz | .................... | F02D 19/061 123/305 |
| 8,370,065 B2 * | 2/2013 | Takashima | ............... | F02D 35/02 123/406.23 |
| 2004/0084024 A1 * | 5/2004 | Malaczynski | ......... | F02D 35/021 123/435 |
| 2006/0137669 A1 * | 6/2006 | Lindner | ................ | F02D 41/146 123/703 |
| 2006/0241848 A1 * | 10/2006 | Strom | ....................... | F02B 1/12 701/105 |
| 2007/0144481 A1 * | 6/2007 | Ciecinski | .............. | F02D 35/028 123/299 |
| 2007/0247164 A1 * | 10/2007 | Bengtsson | .............. | F02P 1/086 324/393 |
| 2008/0040020 A1 * | 2/2008 | Henein | ................. | F02D 35/021 701/109 |
| 2008/0053406 A1 * | 3/2008 | Viele | ..................... | F02D 35/021 123/406.27 |
| 2008/0078359 A1 * | 4/2008 | Barrett | .................... | F02P 5/152 123/406.37 |
| 2008/0264394 A1 * | 10/2008 | Spivak | ................... | F02D 19/06 123/575 |
| 2009/0078234 A1 * | 3/2009 | Barrett | .................. | F02P 5/1522 123/406.37 |
| 2009/0132145 A1 * | 5/2009 | Angeby | ................... | F02D 35/02 701/102 |
| 2009/0223485 A1 * | 9/2009 | Hamedovic | ........... | F02D 35/023 123/435 |
| 2009/0281708 A1 * | 11/2009 | Loeffler | ................... | F02D 35/02 701/103 |
| 2010/0057327 A1 * | 3/2010 | Glugla | .................. | F02D 35/028 701/103 |
| 2010/0107611 A1 * | 5/2010 | Cleary | .................. | F01N 3/0814 60/288 |
| 2010/0116249 A1 * | 5/2010 | Guerrassi | .............. | F02D 35/023 123/435 |
| 2010/0138138 A1 * | 6/2010 | Schoen | ................. | F02D 35/028 701/103 |
| 2010/0206267 A1 * | 8/2010 | Glugla | ................. | F02D 35/021 123/406.26 |
| 2010/0293926 A1 * | 11/2010 | Perry | .................... | B01F 3/04049 60/286 |
| 2015/0300278 A1 * | 10/2015 | Badawy | ............... | F02D 41/1458 123/406.26 |

* cited by examiner

Figure 6  Main Combustion Control Mode

AUTONOMOUS OPERATION OF ELECTRONICALLY CONTROLLED INTERNAL COMBUSTION ENGINES ON A VARIETY OF FUELS AND/OR OTHER VARIABILITIES USING ION CURRENT AND/OR OTHER COMBUSTION SENSORS

RELATED APPLICATIONS

The present application is a 371 national stage application of PCT Application No. PCT/US2012/022774, filed Jan. 26, 2012, which application claims the benefit of U.S. Provisional Patent Application No. 61/437,246 filed on Jan. 28, 2011 which is incorporated herein by reference in its entirety.

BACKGROUND

Field of the Invention

The present application relates to the control of the combustion process in electronically controlled internal combustion engines for operation on a multitude of fuels, and other variabilities over the lifetime of the engine.

SUMMARY

The system and method provided enable electronically controlled internal combustion engines to self-adjust different parameters and operate properly on different fuels that have wide ranges of physical and chemical properties, and are produced from different basic stocks, and account for variabilities in fuel batches, ambient conditions, production tolerances, component drift and ageing over the life time of the engine. For compression ignition engines, the fuel used can be the conventional diesel fuel available on the market or an alternative petroleum derived fuel having different properties than the conventional diesel fuel or a bio-fuel. Such properties include, but are not limited to, volatility, cetane number, density, and heating value. Alternative fuels include aviation fuels such as (JP-8), synthetic fuels such as (S-8). Renewable fuels that may be used include, but are not limited to, Biodiesel fuels, alcohols, and their blends with other petroleum derived fuels. For spark ignition engines, the fuel used can be gasoline of different properties and octane numbers, gasoline blends with other fuels such as bio-fuels (ethanol), kerosene, compressed natural gas (CNG), hydrogen, or any other fuel. Also, the system and method provided enable electronically controlled internal combustion engines to self-adjust different parameters and operate properly and account for variabilities in fuel batches, ambient conditions, production tolerances, components drift and aging over the lifetime of the engine.

The method utilizes an input from a sensor that gives a signal indicative of the combustion process. The signal can be acquired using sensors such as an ion current sensor, a cylinder gas pressure sensor, or an optical sensor. The signal from the sensor is fed into the ECU (Engine control unit). The ECU processes the signal and readjusts the engine operating parameters to achieve its goals such as power, best fuel economy, gaseous and particulate emissions, engine noise, and vibration. The engine operating parameters include, but are not limited to, parameters of the fuel delivery system, air delivery system, ignition system, inlet and exhaust valves systems, exhaust system, exhaust recirculation system, after treatment systems and cooling system.

Electronically controlled internal combustion engines may be optimized by the manufacturer to operate and achieve their production goals using certificated and conventional fuels and some limited blends with renewable fuels. The system described in this application enables these engines to have an autonomous operation on a multitude of fuels without any outside intervention. Also, the systems described in this application can respond to small variations in the supplied fuel associated with patch to patch variation, station to station variation, and fuel ageing. These small variations in the fuel can affect negatively on the engine performance and engine out emissions. Also, variabilities in ambient conditions, production tolerances, component drift and ageing may cause loss in performance and increase in emissions. However, by applying the system described in this application, the engine can account for all these variablilities and adjust autonomously engine parameters in order to achieve desired targets in power, best fuel economy, gaseous and particulate emissions, engine noise, and vibration.

The application provides a method of controlling combustion in internal combustion engines using a signal indicative of the in-cylinder combustion process. A signal can be produced by a sensor such as an ion current sensor, a cylinder pressure sensor, or an optical sensor. The ion current sensor and the cylinder pressure sensor can be standalone units, or they can be integrated within the glow plug, spark plug, or the fuel injector. The optical sensor can be a standalone unit, or it can be integrated with a self-cleaning device.

Several methods to determine the combustion characteristics and the combustion parameters are disclosed. The control of the combustion process is based on the feedback signal of the current engine cycle, a previous engine cycle or the average of a number of previous cycles. The real-time response of engine actuators can be immediately after the combustion event during the present cycle or it can be after a complete engine cycle or the average of many cycles based on the ECU capability.

The method further includes adjusting the combustion parameters to their proper values in response to any changes in the physical or chemical properties of the supplied fuel or aging of engine components that alter the combustion process. The ion current sensor can be used to detect engine misfire, start of combustion, combustion duration, combustion phasing, location of maximum rate of rise in the ion current signal, location of 50% MBF (mass burn fraction), and other combustion parameters that are related, but not limited to engine power, best fuel economy, gaseous and particulate emissions, engine noise and vibration. Meanwhile, the pressure sensor can be used to detect engine misfire, start of combustion, combustion phasing, peak pressure location and magnitude, location and magnitude of maximum rate of pressure rise, location of 50% MBF, and other combustion parameters that are related, but not limited to engine power, best fuel economy, engine noise and vibration. The optical sensor can be used to detect engine misfire, start of combustion, combustion phasing, combustion duration and other combustion parameters that are related, but not limited to gaseous and particulate emissions. Further, it is understood that the control unit may adjust any of the engine operation parameters mentioned herein based on any of the earlier mentioned features or parameters from one or more of the sensors described above.

Further objects, features and advantages of this application in internal combustion engines will become readily apparent to persons skilled in the art after a review of the following description. The following description highlights the application of this system to enable diesel engines equipped with a common rail fuel injection system to operate properly on fuels that have a wide range of different physical and chemical properties. For diesel engines, the injection system has key parameters that can be used to control the combustion process. For the application of this invention in spark ignition (gasoline or gas) engines, the ignition and fuel delivery systems have key parameters that can be used to control the combustion process. The following drawings describe the application of this system in a diesel engine. Equivalent drawings and descriptions can be similarly developed by a person skilled in the art for the application of this system to spark ignited engines The claims apply to all types of internal combustion engines and are appended to and form a part of this specification.

BRIEF DESCRIPTION OF THE DRAWINGS

Aspects of this application will be described by way of examples with references to the accompanying drawings. They serve to illustrate several aspects of the present application in a direct injection diesel engine equipped with ion current sensor and a pressure sensor to be used for feedback control. Drawings together with the description provide explanation of the system principles. In the drawings.

DETAILED DESCRIPTION

Figure 1:
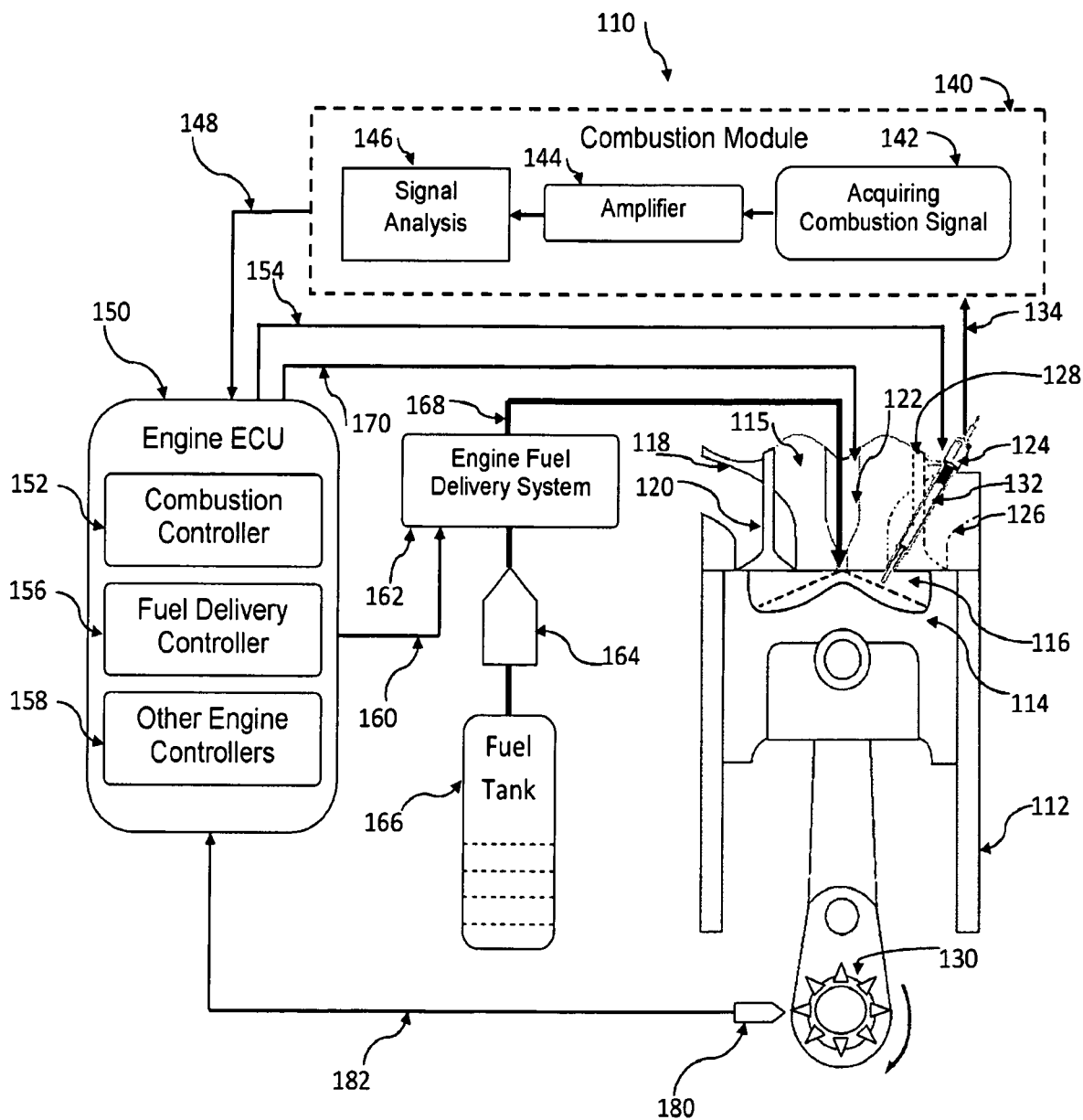
FIG. 1 is a schematic view of a direct injection diesel engine having an ECU that uses the described system to control the combustion using multitude of fuels.

Now referring to FIG. 1, a schematic view of an internal combustion engine 110 is provided. For illustrative purposes the schematic shows a single cylinder direct injection diesel engine however, it is readily understood that other types of single cylinder or multiple cylinders engines such as gasoline engines may be used in combination to form the engine. The cylinder 112 houses piston 114 allowing for reciprocating motion of the piston 114 within the cylinder 112. The combustion chamber 116 is formed by the cylinder houses 112, the piston 114, and the cylinder head 115. Air, a mixture of air and exhaust gases, or other mixtures of any fluid may be provided into the chamber 116 through an intake manifold 118. The flow of air or mixtures made through the intake manifold 118 may be controlled by intake valve 120. Fuel may be provided into the chamber by a fuel injector 122. A glow plug 124 may be used to facilitate the ignition of the fuel inside the combustion chamber 116 in diesel engines. In gasoline engines, a spark plug or another device 124 may be used to ignite the charge causing reciprocating motion of the piston 114. After combustion, the exhaust gases in the chamber may be released through the exhaust manifold 126. Further, the flow of exhaust may be controlled by an exhaust valve 128 located within the exhaust manifold 126. As may be readily understood, combustion in the chamber 116 causes the piston 114 to move away from the cylinder head causing rotation of the crankshaft 130. The inertia of a flywheel or combustion in other chambers will cause the crankshaft 130 to rotate further thereby causing the piston 114 to be continuously in reciprocating motion toward the cylinder head. The glow plug 124 can be turned on by the ECU 150 through an electrical command 154. The glow plug 124 may also include a sensor 132 to monitor activity within the combustion chamber 116 during the entire cycle of the engine. The sensor 132 includes an ion current sensor, a pressure sensor, an optical sensor, or any combination of the above. These sensors may be standalone or integrated with the glow plug, spark plug, or the fuel injector 122. The sensor signal 134 may be provided to a combustion module 140. The combustion module 140 includes an acquisition module 142 for acquiring the combustion signal and amplifier 144 for enhancing the combustion signal and a signal analysis module 146 to determine certain combustion characteristics based on the enhanced combustion signal. The combustion parameters 148 are then provided to an engine control module 150.

The engine control unit 150 includes a combustion controller 152, a fuel delivery controller 156 and other engine controllers 158. The combustion controller 152 may act as a master module that provides a control signal to different engine components such as the glow plug 124 heater or spark plug, the fuel delivery system 162, or the injector 122. The fuel delivery controller 156 provides a fuel delivery control signal 160 to an engine fuel delivery system 162. The engine fuel delivery system controls the delivery of fuel to the injector 122. The fuel from the tank 166 is delivered by the fuel pump 164 to the fuel delivery system 162. The fuel delivery system 162 distributes the supplied fuel based on a signal from the ECU 160. The fuel is further supplied to the injector 122 through a fuel line 168. In addition, the fuel delivery controller 156 is in communication electronically with the fuel injector 122 to control different injection parameters such as number of injection events, injection durations, injection timings and injection rate shaping as noted by line 170. In addition, the other engine controllers 158 control other engine parameters such as engine speed, load, amount of exhaust gas recirculation, variable geometry turbocharger, or other units installed to the engine. Further, an output sensor 180 may be in communication with the crankshaft 130 to measure crank shaft position, and engine speed, torque of the crankshaft, or vibration of the crank shaft, and provide the feedback signal to the engine control unit 150 as denoted by line 182.

Figure 2:
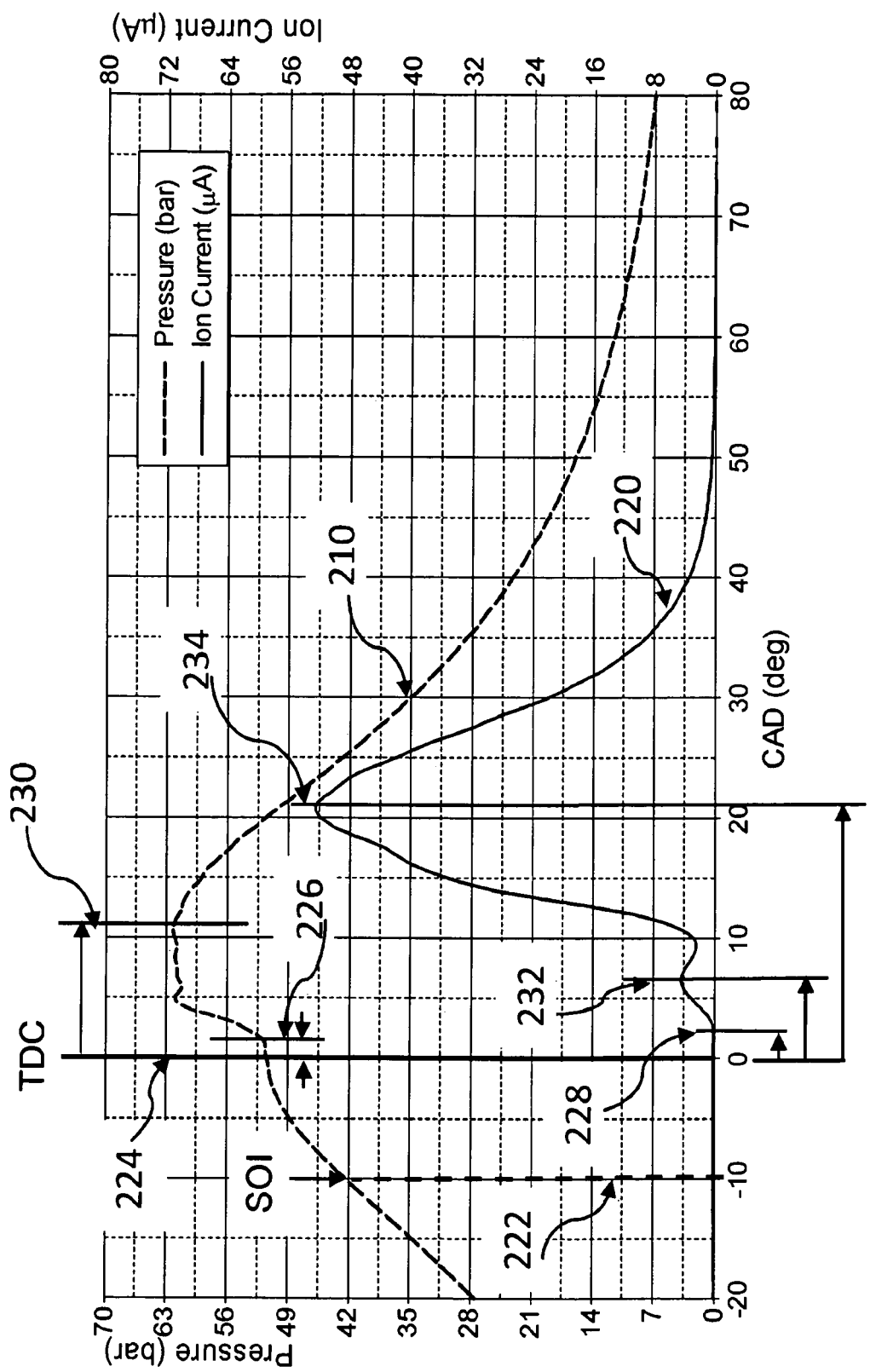
FIG. 2 is a graphical illustration of the cylinder gas pressure and ion current traces versus crank angle degrees for ULSD (Ultra Low Sulfur Diesel) fuel.

Referring now to FIG. 2, the graph of the cylinder gas pressure and ion current are provided with respect to the crankshaft position. The cylinder gas pressure is denoted by line 210 and the ion current is denoted by line 220. The start of injection is denoted by line 222 occurs at crankshaft piston position −10°. The pressure signal 210 may have the units in bar, and the ion current signal 220 may have units in volt or micro ampere. At the start of injection the ion current was recorded at datum (zero) and the cylinder pressure is high in the compression stroke. The top dead center position is denoted by line 224. The following terms may be used as an input from the signal analysis 146 to the engine control unit 150. Line 226 denotes the start of combustion (SOC) in the signal 210 developed from the pressure inside the combustion chamber 114. Also, Line 228 denotes the start of combustion detected by the start of ion current (SIC) signal 220. Line 230 represents the location of the maximum cylinder pressure during combustion. Line 232 represents the location of the first peak in the ion current signal 220. Line 234 represents the location of the second peak in the ion current signal 220. Each of these characteristics of the cylinder pressure and ion current may be used to identify the characteristics of the type of fuel used in the engine as well as to adjust the engine parameters to achieve different targets. For spark ignition engines, the cylinder gas pressure and ion current signals may look different than the signals In FIG. 2, but a person skilled in the art can identify their characteristics in a manner similar to what is described in this application.

Figure 3:
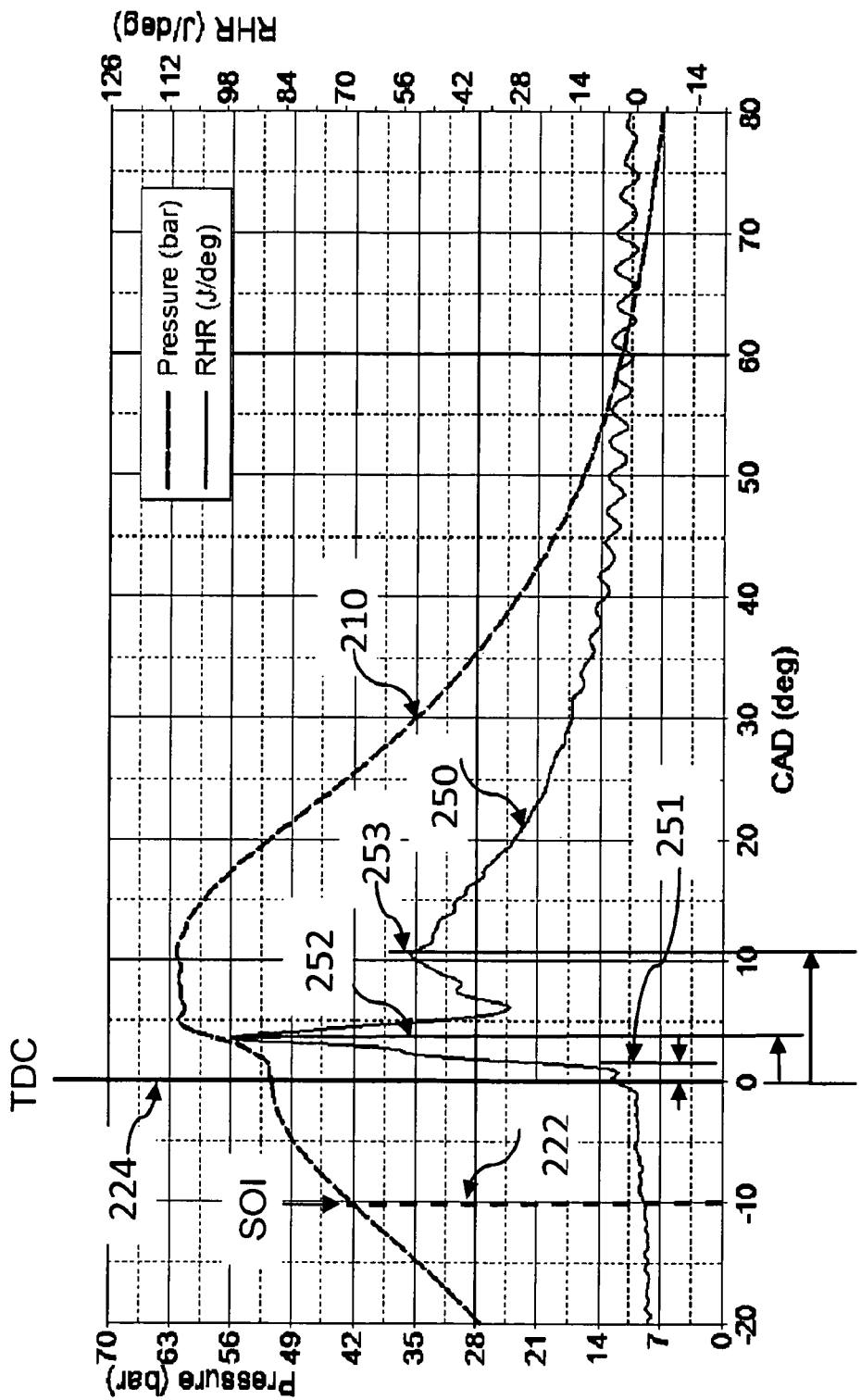
FIG. 3 is a graphical illustration of the cylinder gas pressure and rate of heat release traces versus crank angle degrees for ULSD fuel.

Now referring to FIG. 3, the graph of the cylinder gas pressure and rate of heat release (RHR) are provided with respect to the crankshaft position. The cylinder gas pressure is denoted by line 210 and the rate of heat release is denoted by line 250. The rate of heat release is calculated from the pressure signal 210. Line 251 denotes the start of combustion (SOC) in the rate of heat release signal 250. Line 252 represents the location of the first peak at the rate of heat release 250. Line 253 represents the location of the second peak at the rate of heat release 250.

Figure 4:
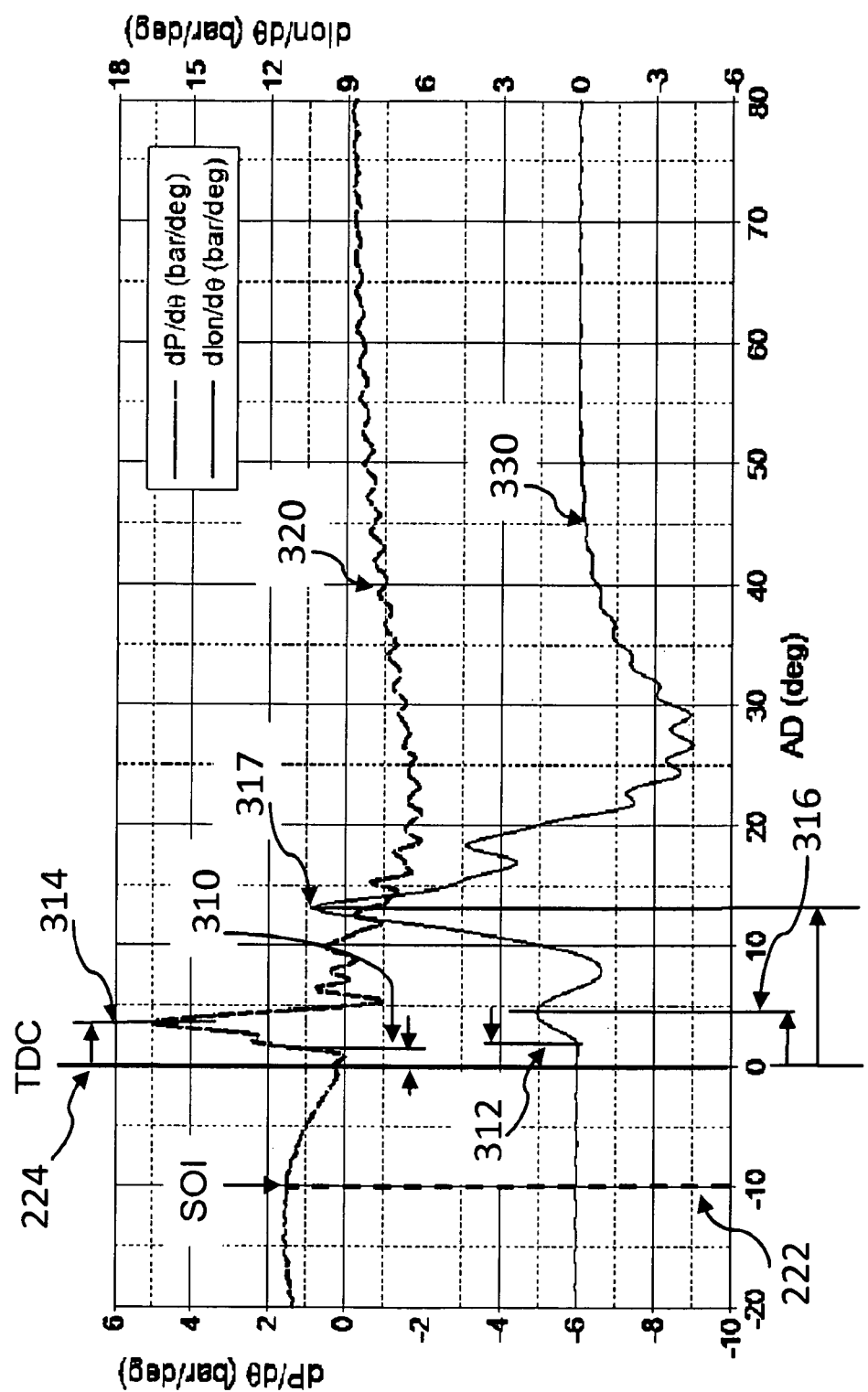
FIG. 4 is a graphical illustration of rates of change of cylinder gas pressure and ion current versus crank angle degrees for ULSD fuel.

Now referring to FIG. 4, line 320 represents the derivative of the cylinder gas pressure while line 330 represents the derivative of the ion current signal. Line 310 corresponds to line 226 in FIG. 2 which represents the start of combustion (SOC) which occurs just at the beginning of the increase in cylinder pressure due to combustion. Line 312 corresponds to line 228 in FIG. 2 which represents the start of ion current signal (SIC) and occurs just prior to an increase in the ion current. Line 314 represents the maximum slope of the pressure rise due to combustion. Line 316 occurs at the peak of the derivative of the ion current leading to the first peak 232 of line 220 in FIG. 2. Line 317 corresponds to the second peak in the derivative of the ion current leading to the second peak 234 of the ion current 220 in FIG. 2.

Figure 5:
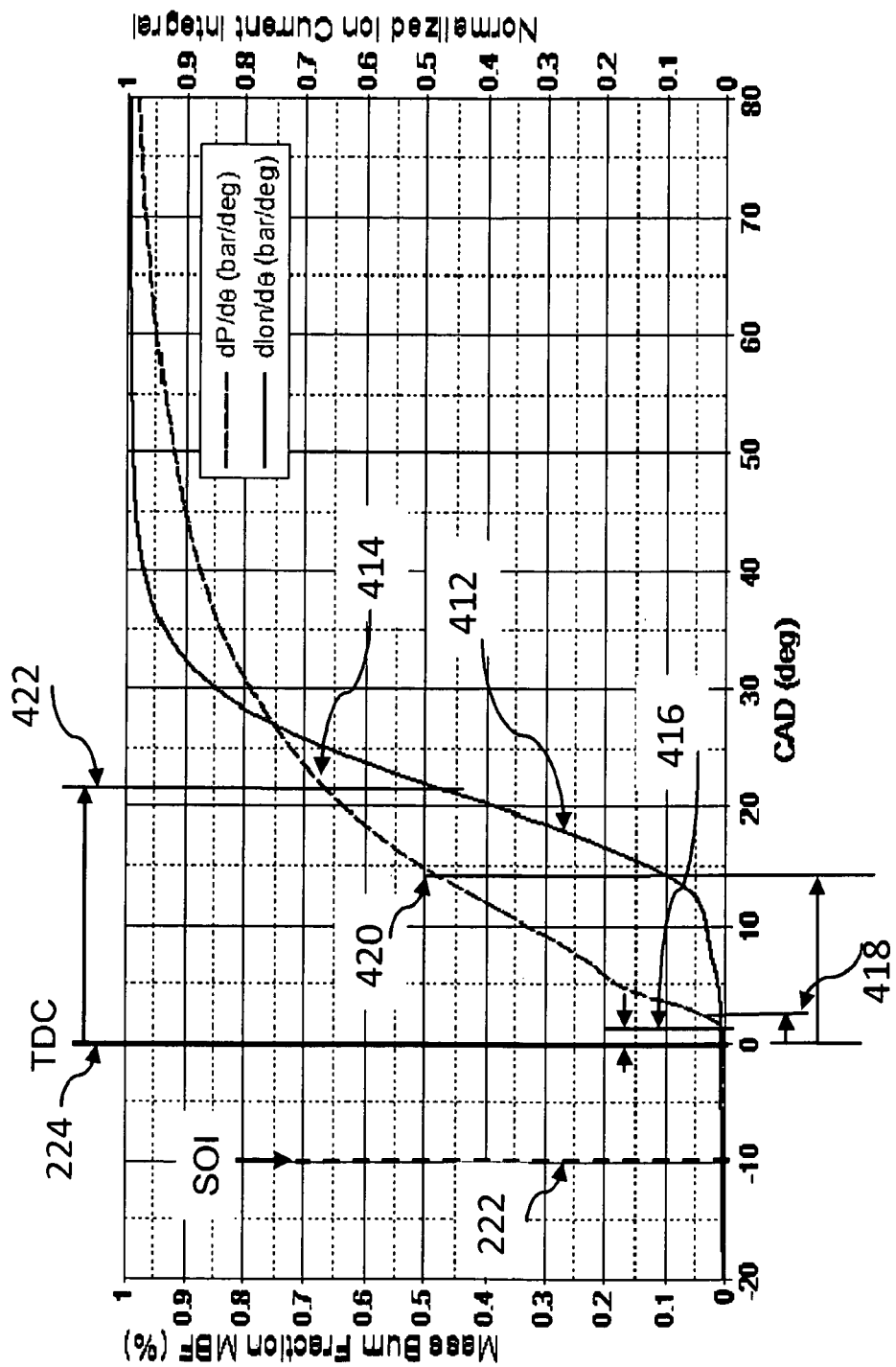
FIG. 5 is a graphical illustration of mass burn fraction (MBF) and cumulative ion current versus crank angle degrees for ULSD fuel.

Now referring to FIG. 5, a graph of the ion current integral is provided by line 412 and a graph for the percent of mass burn fraction (MBF percent) is provided by line 414. MBF is estimated from the rate of heat release calculated from the cylinder gas pressure signal 210. Line 416 indicates the point for the start of combustion and occurs where the fuel begins to burn corresponding to line 226 in FIG. 2. Line 418 represents the start of combustion (SIC) from the ion current integral 412 and occurs where the ion current integral begins to increase which corresponds to line 228 in FIG. 2. Line 420 represents the position where 50% of the fuel has been burned, and line 422 represents the location of 50% of ions produced during combustion. The location and the amplitude of parameters mentioned above define the characteristics of the fuel combustion from the ion current and the pressure signals, where the resulting ionization or pressure characteristics (location and amplitude) represented by lines 226, 228, 230, 232, 234, 251, 252, 253, 310, 312, 314, 316, 317, 416, 418, 420, and 422 relative to TDC 224 are indicators for the auto ignition process and the combustion characteristics of the fuel supplied to the engine.

Figure 6:
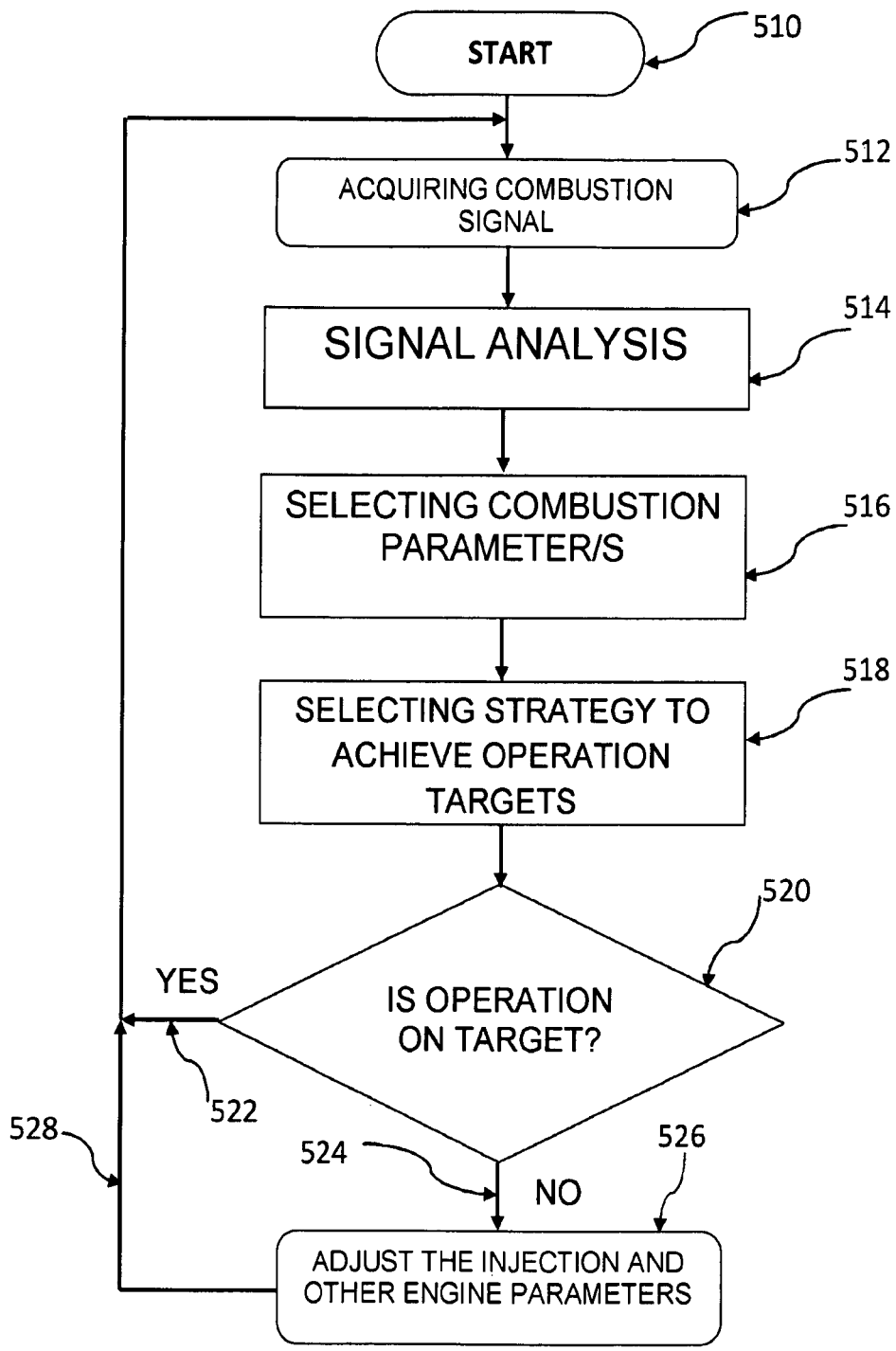
FIG. 6 is a flow chart illustrating the algorithm for use of the combustion signal to achieve operation targets (Main combustion control mode)

Now referring to FIG. 6, the flow chart illustrating the algorithm for use of the combustion signal is provided. The method starts in block 510 and proceeds to block 512. In block 512, the combustion signal is acquired. The combustion signal can be from any combustion indicator (sensor) such as the cylinder pressure sensor, the ion current sensor, or any other combustion sensor. In block 514, the signal is analyzed to determine the various combustion parameters, for example, any of the combustion parameters noted in the previous graphs in FIGS. 2-5 or other parameters derived from them. The combustion parameters are selected as denoted in block 516. In block 518, a strategy is selected to achieve the operation targets of the engine. Selecting the strategy to achieve the operation targets may include but not limited to power required (torque and speed), best fuel economy, limited peak pressure, engine out emissions, gas temperature and composition, or other targets. These targets may be developed by the engine manufacturers to meet the production targets explained above. In block 520, it is determined whether the operation of the engine is on target. If the operation of the engine is on target based on the feedback provided by different engine sensors and the combustion sensor, the method follows line 522 to block 512 where the combustion signal is acquired once again for the continuous control of the engine. If the operation of the engine is not on target, the method follows line 524 to block 526. In block 526, the engine parameters are adjusted based on the selected strategy to bring engine operation closer to target. Once the engine parameters have been adjusted in block 526, the method follows line 528 to block 512 where the combustion signal is once again acquired and the method is repeated.

Figure 7:
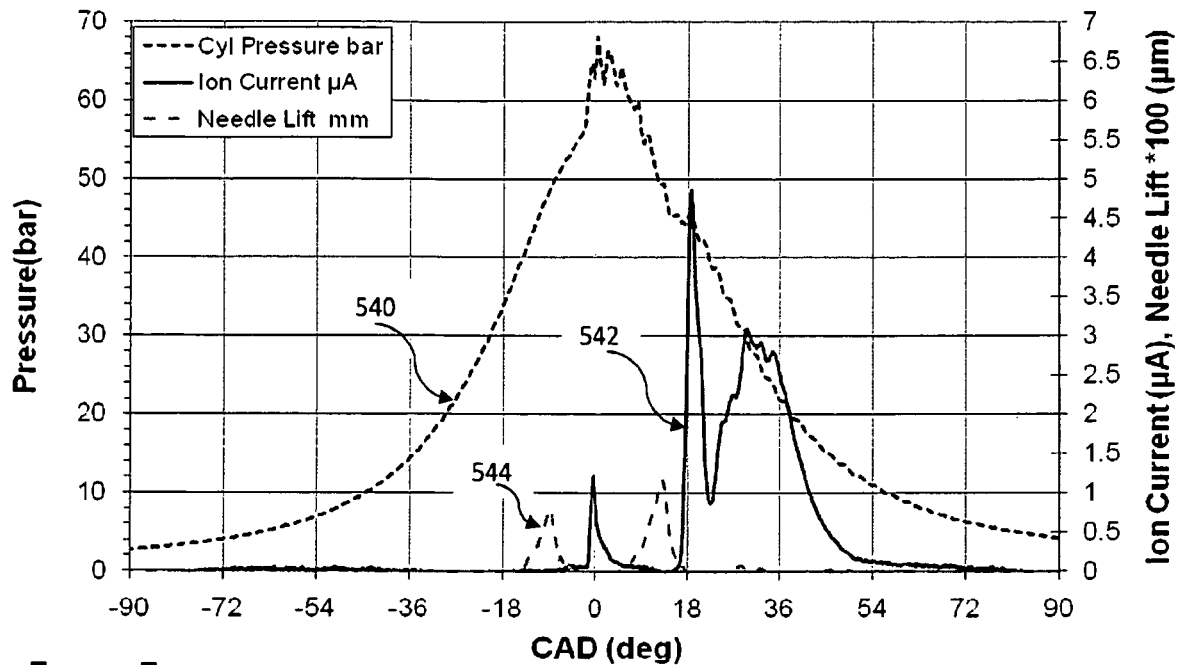
FIG. 7, FIG. 8, FIG. 9 and FIG. 10 are graphical illustrations of the ion current characteristics under different injection strategies for ULSD fuel.

Now referring to FIG. 7, a graphical illustration of the ion current characteristics for "double injection" strategy is provided. The cylinder gas pressure is denoted by line 540. The ion current is denoted by line 542. Line 544 illustrates the needle lift of the fuel injector. As can be seen from line 544, the needle is lifted twice representing the two events on line 544. As such, a first injection event occurs followed by a second injection event. Accordingly, based on the combustion parameters and the engine operation target, the number of injection events, the timing of the injection events, and the duration of the injection events may each be manipulated according to the control strategy. Both the cylinder gas pressure 540 and the ion current 542 were able to identify the combustion characteristics, where the start of combustion was monitored twice due to the split injection strategy used. The first peak in the ion current signal indicates a combustion incident due to the first injection event, the second peak in the ion current indicates the combustion process due to the second injection event. It should be noted that the combustion indicator can be based on the rate of heat release and the parameters shown in FIGS. 2 to 5. In the following sections the discussions will be in terms of the ion current as a combustion indicator.

Figure 8:
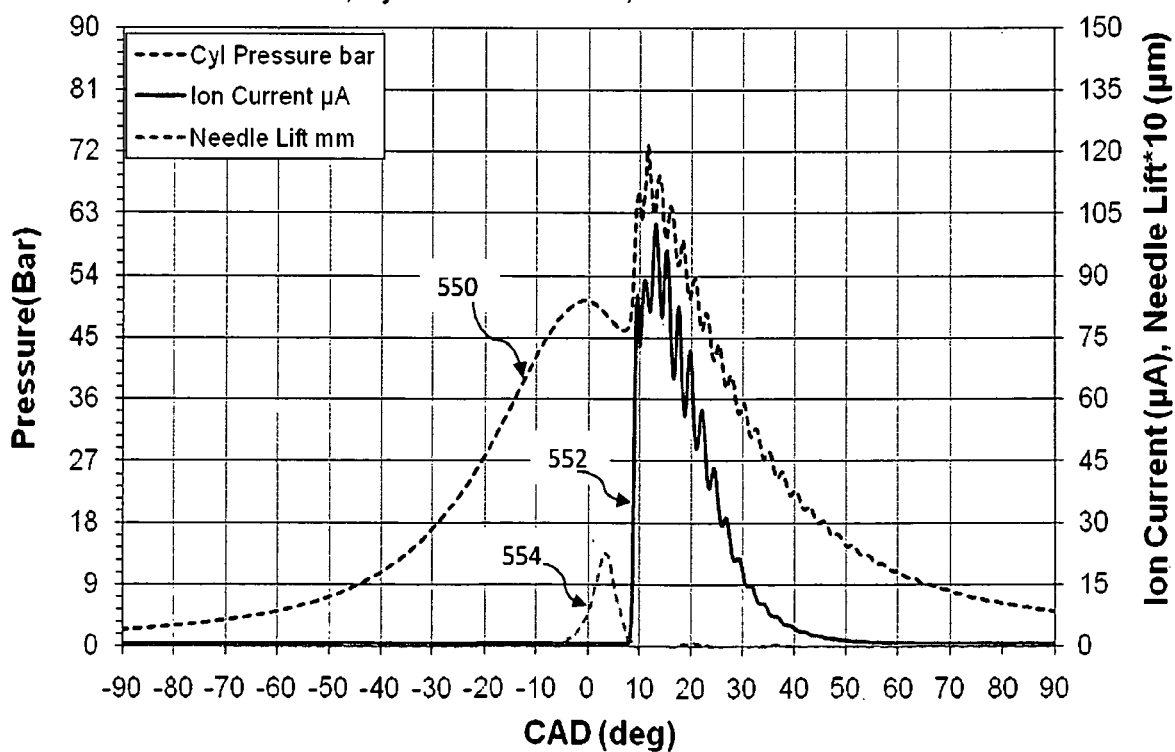

Now referring to FIG. 8, a graphical illustration of the ion current characteristics using "single injection" strategy is provided. In this strategy one injection event is identified as can be seen from line 554 illustrating the needle lift. Further, the cylinder gas pressure is denoted by line 550 while the ion current is denoted by line 552. Both the cylinder gas pressure 550 and the ion current 552 were able to identify the combustion characteristics, where the start of combustion was monitored. The frequency of the fluctuation wave in the ion current signal which corresponds to the fluctuation in the pressure signal may be an indicative of engine noise and vibration, which varies with different fuels used.

Figure 9:
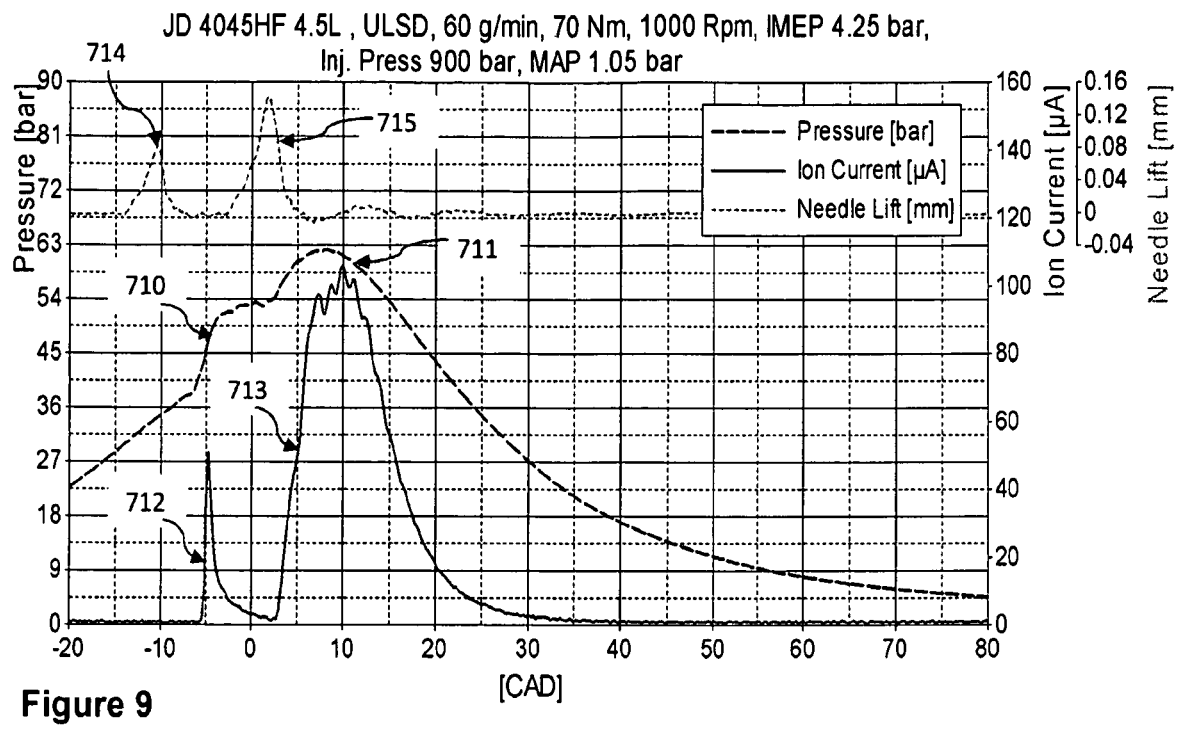

Now referring to FIG. 9, a graphical illustration of the ion current characteristics using pilot and main injection strategy is provided. Both the cylinder gas pressure and the ion current were able to identify the combustion characteristics, where the start of combustion was monitored twice due to the split injection strategy used. The first peak in the ion current signal 712 indicates a combustion incident which was also represented in the pressure signal 710 due to the first injection event 714, the second peak in the ion current 713 indicates the second combustion event which was also represented in the pressure signal 711 due to the second injection event 715. It should be noted that the combustion process can be characterized using the parameters shown in FIGS. 2 to 5.

Figure 10:
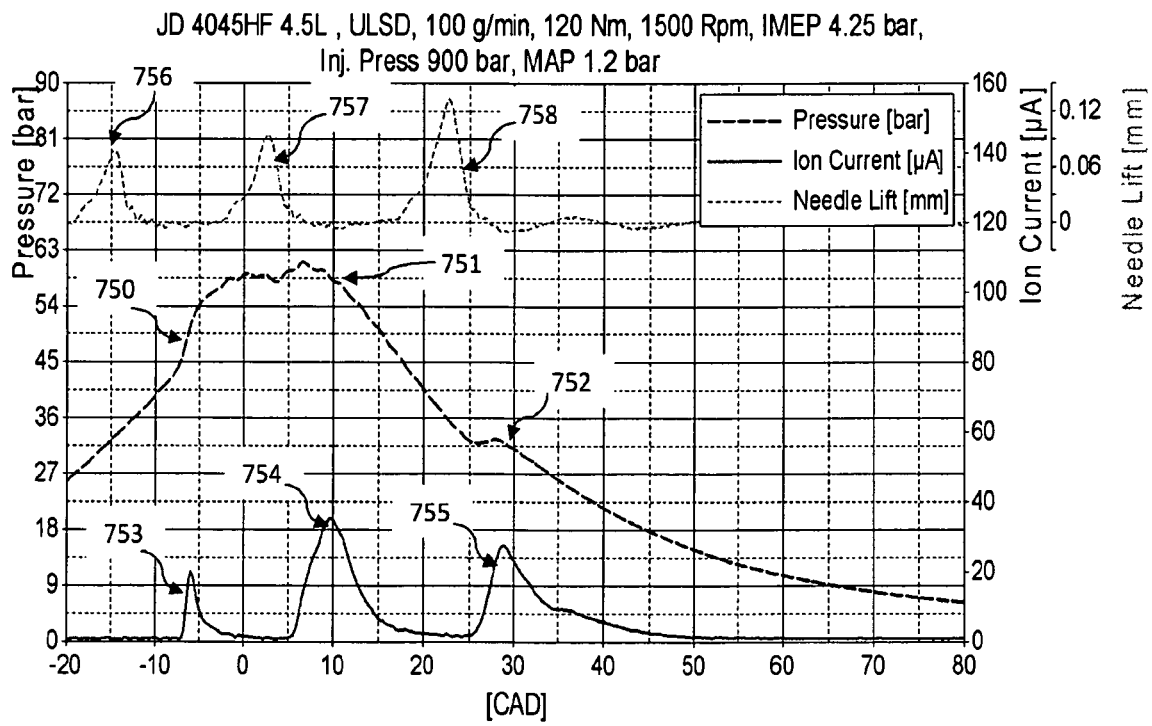

Now referring to FIG. 10, a graphical illustration of the ion current characteristics using pilot, main, and post injection "Multiple injection strategy". The combustion started in the ion current signal at 753 developed from the pilot injection 756. Then, the main injection event 757 followed the pilot injection 756, which resulted in another combustion monitored by the ion current signal 754. A post injection 758 was introduced late in the expansion stroke that developed the third combustion event detected by the ion current signal 755. Also, the pressure signal recorded three previously monitored combustion events denoted by 750, 751, and 752 respectively.

Figure 11:
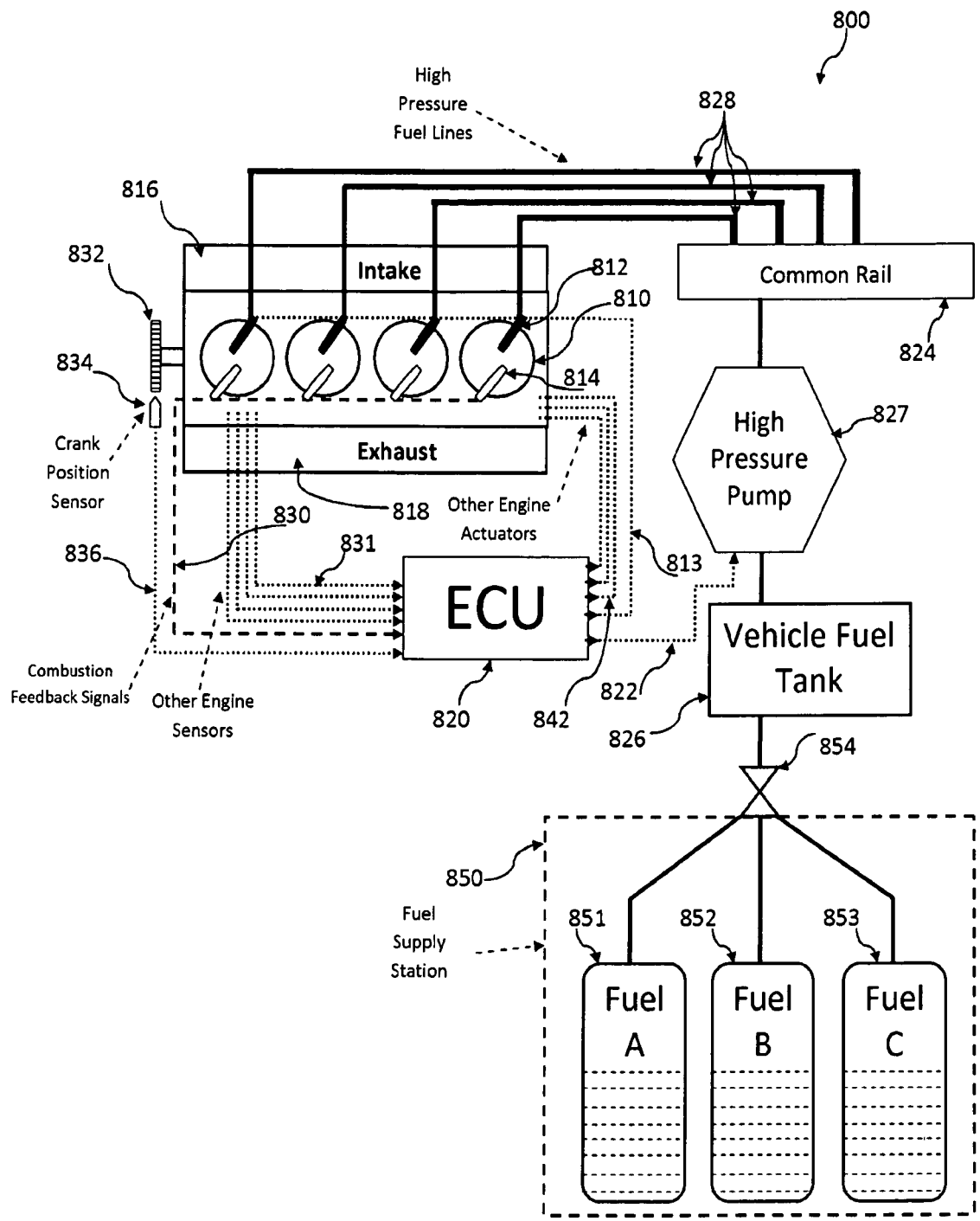
FIG. 11 is a schematic view of a multi cylinder engine having ECU that controls combustion on a multitude of fuels.

Now referring to FIG. 11, a schematic view of a multi-cylinder diesel engine is provided that controls combustion for a multitude of fuels, or different batches of the same fuel using the described system. The engine 800 includes a plurality of cylinders 810. Each cylinder having a fuel injector 812 and a combustion feedback sensor 814. In case of spark ignition engines, a spark plug may be included inside each cylinder for combustion timing control. The air is provided to the cylinder through an intake manifold 816 and exhaust is removed from the cylinder from an exhaust manifold 818. An engine control unit 820 is provided to receive feedback from the engine and control the engine parameters as described with regard to the previous implementations. The electronic control unit 820 provides a fuel pressure actuation signal 822 to a fuel delivery system 827. The fuel delivery system 827 includes a high pressure pump 827 to draw fuel from a fuel tank 826. The fuel pressure actuation signal 822 may control the fuel pressure that is provided by the fuel delivery system to the common rail 824, which distribute the fuel to the high pressure fuel lines 828. The high pressure fuel lines 828 provide fuel to the fuel injectors 812 of each of the cylinders 810. The fuel injector 812 may also receive a signal from the electronic control unit 820 to control the number of injection events, timing and duration of the fuel into the combustion chamber through electronic signals 813. The combustion feedback sensor 814 may provide a combustion feedback signal 830 to the electronic control unit 820. The reciprocating motion of the pistons in cylinders 810 serves to turn the crankshaft 832. A crank position sensor 834 is configured to determine the crank position angle and provide a crank position signal 836 to the electronic control unit 820. The fuel tank 826 may be filled with a fuel through a supply valve 854. The enclosure 850 represents fuel suppliers or gas stations that supply various fuels. An example of three different fuels is represented by three fuel tanks A, B, and C detonated as 851, 852, and 853 respectively. Each of these tanks may have different fuels that have wide ranges of physical and chemical properties, and are produced from different basic stocks. These tanks may also have the same type of fuel but with some variability in their chemical or physical properties. For diesel engines, the fuel used can be the conventional ULSD fuel available on the market, an alternate petroleum derived fuel having different properties than the conventional ULSD fuel, a bio-fuel or a blend of the these fuels. Such properties include but not limited to volatility, cetane number, density, and heating value. Alternate fuels include aviation fuels such as (JP-8) or synthetic fuels such as (S-8). Renewable fuels include but not limited to Biodiesel fuels, alcohols, and their blends with other petroleum derived fuels. For spark ignition engines, the fuel can be liquid, gasoline of different octane numbers, a biofuel such as ethanol, a blend of gasoline and a bio-fuel, gas or liquefied gas depending on the type of engine and its application. Further, the engine 800 may be supplied by blends of any fuel developed by a fuel supplier or blends due to filling the vehicle fuel tank 826 from different suppliers/stocks or sources.

Figure 12:
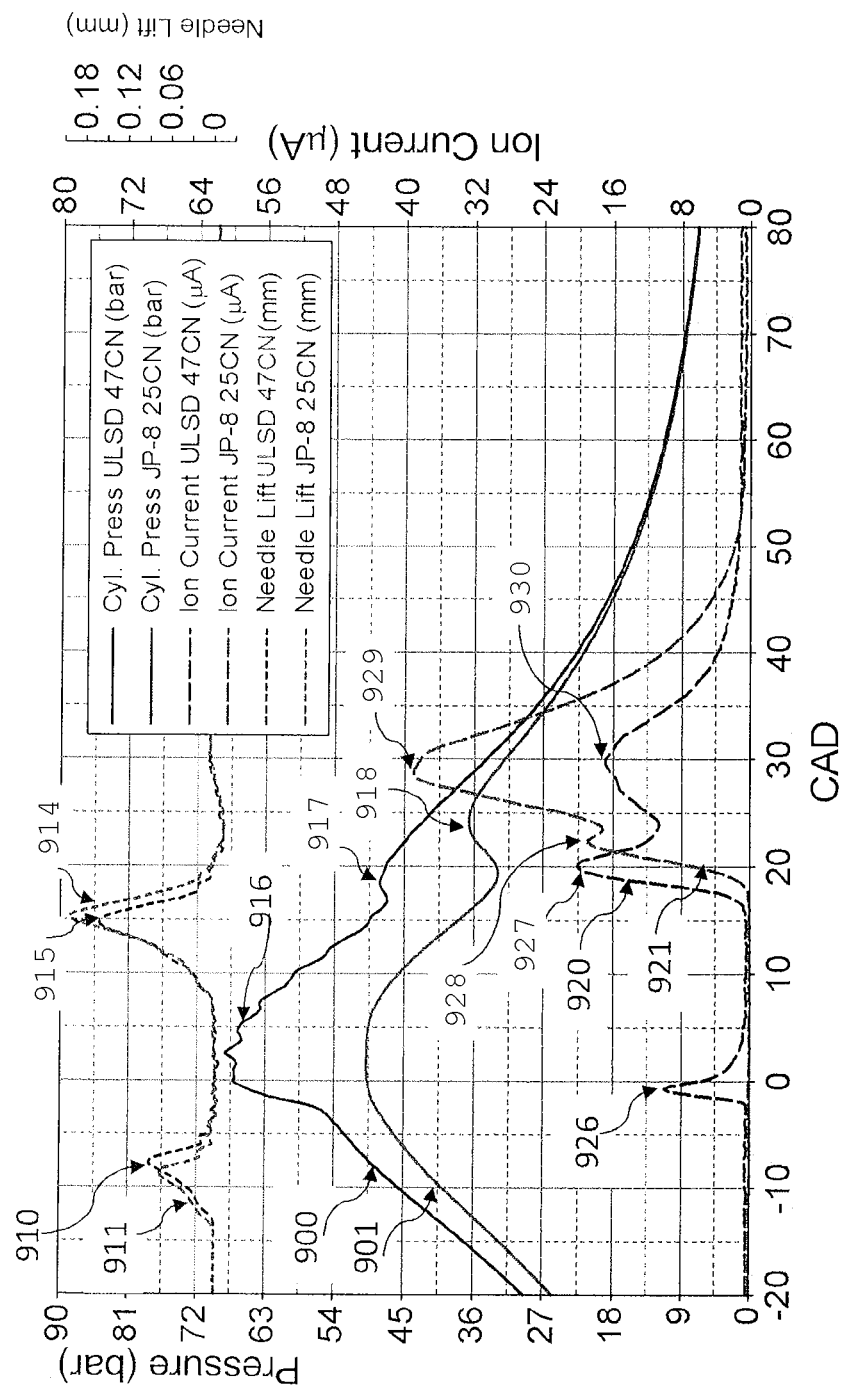
FIG. 12 is a graphical representation of the cylinder gas pressure and ion current and needle lift traces versus crank angle degrees for a 47 CN ULSD fuel (diesel fuel that has a cetane number equal to 47) and a 25 CN JP-8 aviation fuel (poor ignition fuel that has a cetane number equal to 25)

Now referring to FIG. 12, a graphical representation of cylinder gas pressure and ion current is provided with respect to crank angle degrees that represents the prior art, where the original ECU is calibrated by the manufacturer to run the engine efficiently on the conventional 47 CN ULSD fuel applying two injection events. Line 900 indicates the cylinder gas pressure while using the 47 CN ULSD fuel. Line 901 illustrates the cylinder gas pressure using aviation fuel 25 CN JP-8. The pressure trace 900 for ULSD shows a pressure rise 916 due to the combustion of the first injection event 910. Also, line 900 shows a pressure rise 917 due to the combustion of the second injection event 914. The pressure trace 901 for the 25 CN JP-8 does not show any visible pressure rise due the combustion of the first event 911. However, line 901 shows a pressure rise due to the combustion of the second injection event 915. This indicates that the first injection event of JP-8 25 fuel did not burn well. The ion current trace 920 for ULSD fuel shows ion current first peak 926 produced from the combustion of the first injection event and first peak 927 from the combustion of the second injection event. Also line 920 for the ion current shows a second ion peak due to combustion of the second injection event. The ion current trace 921 for the 25 CN JP-8 does not show clearly an ion current peak that corresponds to the combustion of the first injection event 911. However, the ion current trace for the 25 CN JP-8 shows a first peak 928 from the combustion of the second injection event. Also, line 921 for the 25 CN JP-8 shows a second peak that corresponds to the second injection event. The poor ignition quality of the 25 CN JP-8, shown from the traces in FIG. 12, had an impact on the work made by the gases on the piston. Therefore, lower indicated power of 8.10 kW in case of the 25 CN JP-8 compared to 8.30 kW for the 47 CN ULSD. In addition, the indicated thermal efficiency dropped from 50.7% for the 47 CN ULSD to 44.8% for the 25 CN JP-8 recording a higher specific fuel consumption of 192 g/kW·h compared to 170 g/kW·h for the 47 CN ULSD. FIG. 12 represents other systems that fail to identify the fuel behavior in developing the combustion process, which lead to a poor combustion quality for fuels other than engine performance calibrated fuel.

Figure 13:
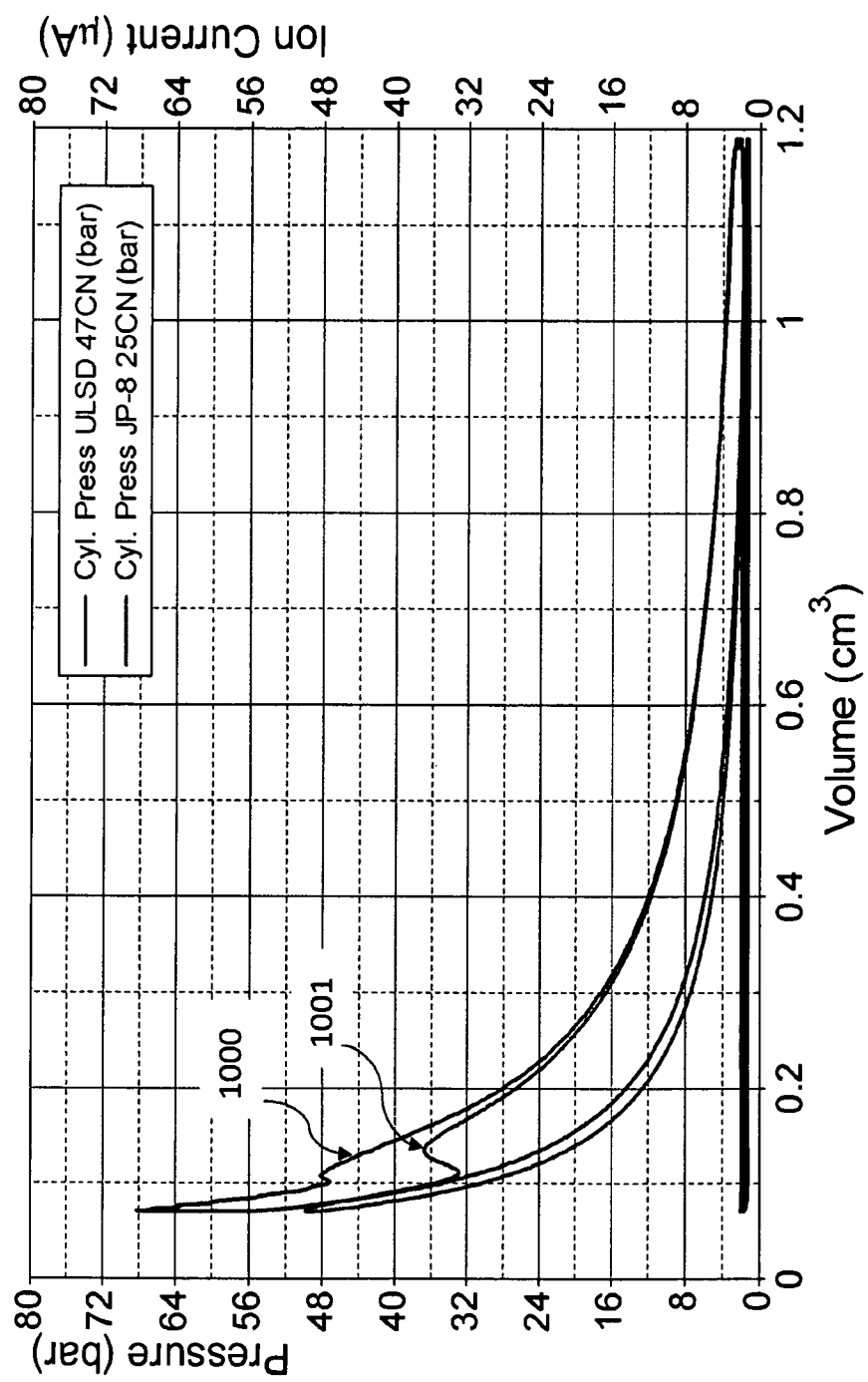
FIG. 13 is a graphical representation of the cylinder gas pressure versus cylinder volume for a 47 CN ULSD fuel and a 25 CN JP-8 aviation fuel.

Now referring to FIG. 13, a graphical representation of the cylinder pressure is provided with respect to the cylinder volume. Line 1000 illustrates the pressure for the 47 CN ULSD fuel while line 1001 represents the pressure for the 25 CN JP-8 fuel. The areas of these diagrams represent the indicated work produced by combustion of each fuel in the engine. Since the engine is calibrated to operate properly on 47CN ULSD fuel, it is less efficient and produces less power when operated on the 25 CN JP-8.

Figure 14:
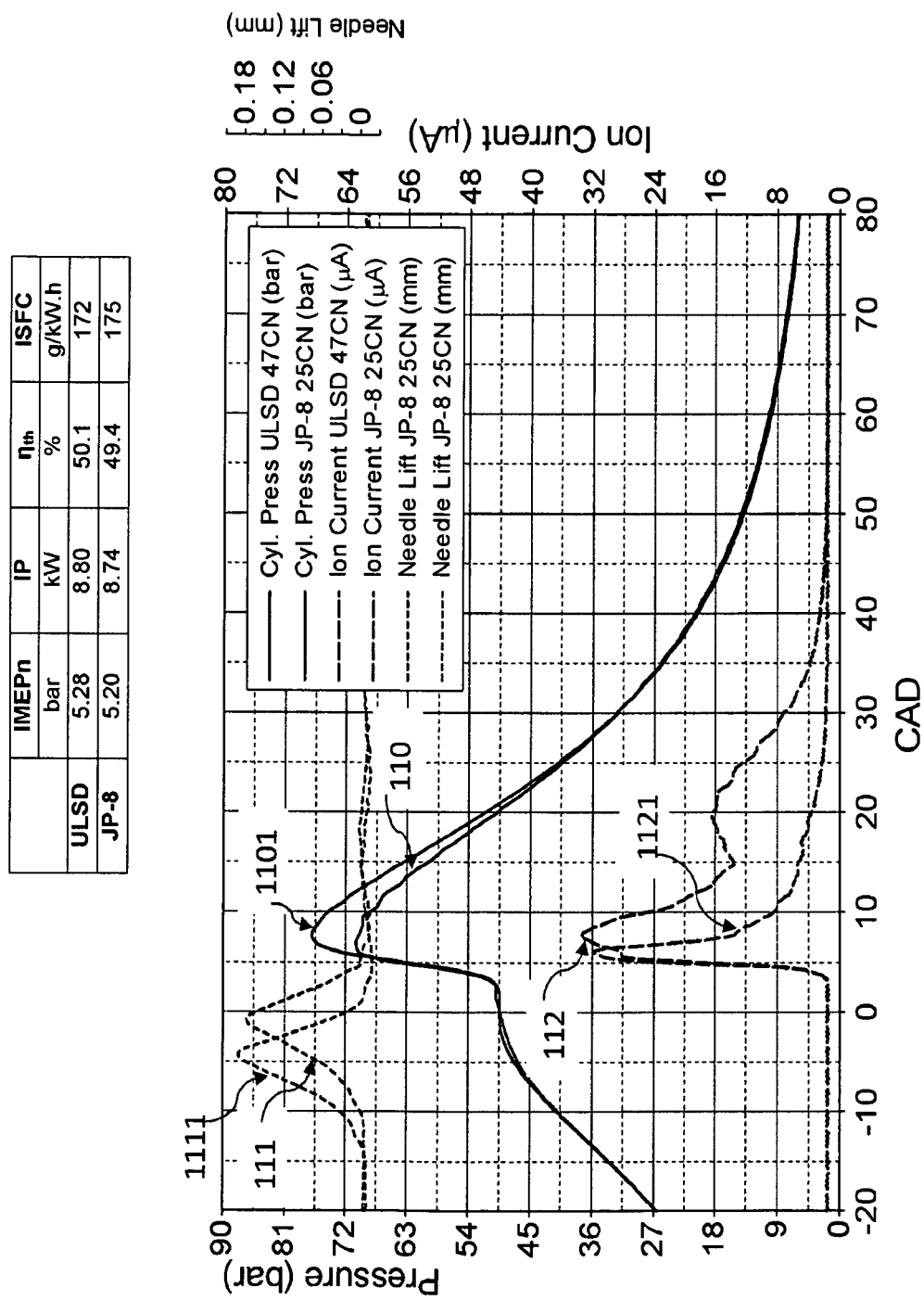
FIG. 14 is a graphical representation of the cylinder gas pressure, needle lift and ion current traces versus crank angle degrees for a 47 CN ULSD fuel and a 25 CN JP-8 aviation fuel using the described system.

Now referring to FIG. 14, a graphical representation of cylinder pressure and ion current is provided with respect to crank angle degrees that represents an example where ECU can autonomously produce the required power by self-adjusting its controlled parameters to run the engine efficiently on any fuel. Line 1100 represents the cylinder pressure for the 47 CN ULSD fuel, while line 1101 represents the cylinder pressure for the 25 CN JP-8 fuel. As can be seen with respect to FIG. 11, the pressure shown by line 1101 has been greatly improved. The improvement in the combustion of the 25 CN JP-8 fuel is also reflected in the ion current. Line 1120 represents the ion current for 47 CN ULSD fuel while line 1121 represents the ion current for 25 CN JP-8 fuel. Line 1110 represents the needle lift or injection event for the 47 CN ULSD fuel, while line 1111 represents the needle lift or fuel injection event for the 25 CN JP-8 fuel. As can be seen here, the injection event represented by line 1111 has been shifted relative to the one denoted by line 1110 as a result of the differences in the physical properties of the fuels. In spite of this shift in the start of needle lift, the system is able to bring the combustion of the 25 CN JP-8 in phase with the combustion of the 47 CN ULSD fuel with minor differences in power and thermal efficiency.

Figure 15:
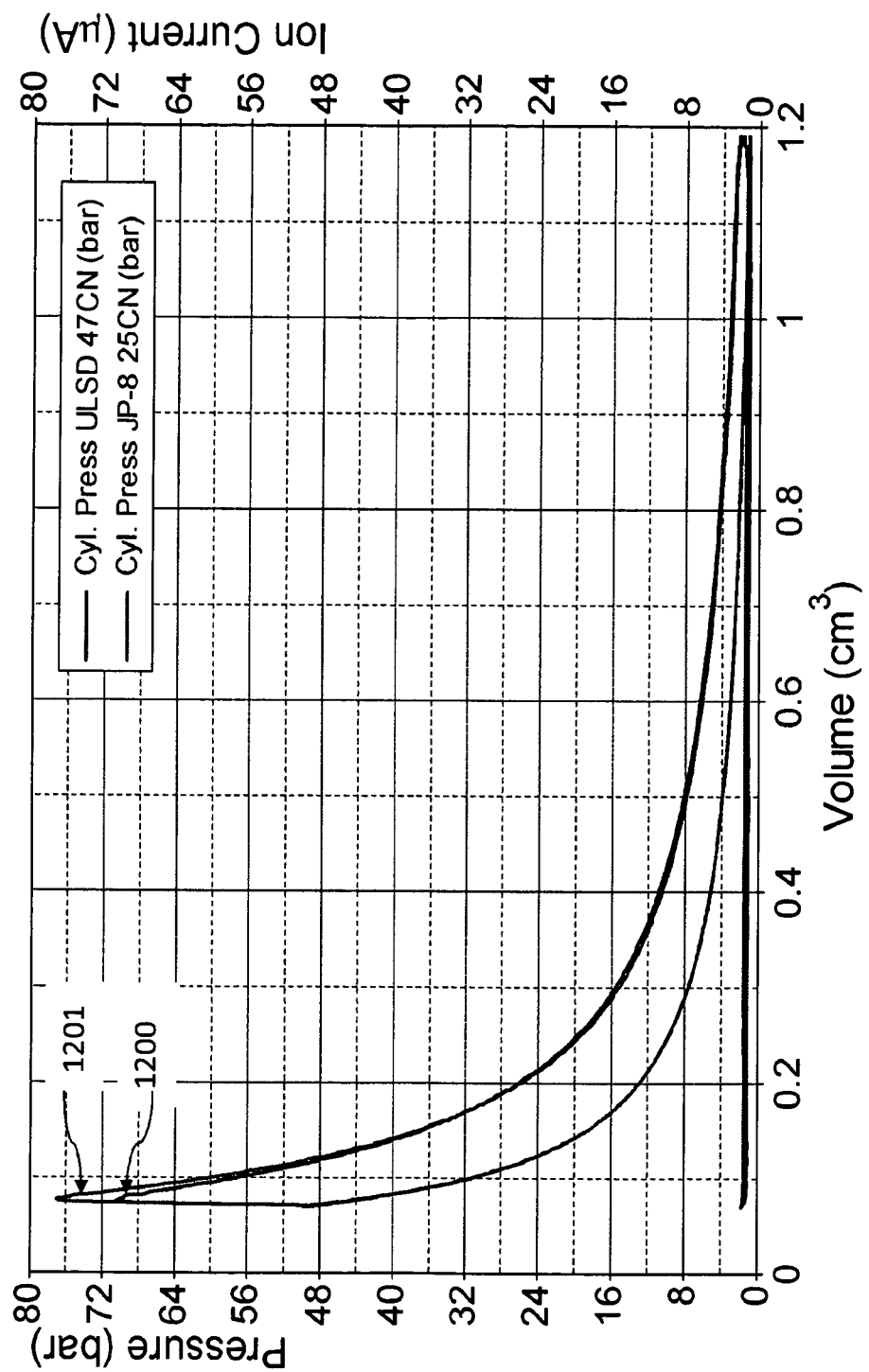
FIG. 15 is a graphical representation of the cylinder gas pressure versus swept volume for a 47 CN ULSD fuel and a 25 CN JP-8 aviation fuel using the described system.

Now referring to FIG. 15, a graphical representation of the cylinder pressure is provided with respect to the cylinder volume. Line 1200 illustrates the pressure for the 47 CN ULSD fuel while line 1201 represents the pressure for the 25 CN JP-8 fuel. The areas of these diagrams represent the work done by the combustion of each fuel in the engine. Comparing the areas in FIG. 13 and FIG. 15, demonstrates the effectiveness of the system in readjusting the engine parameters for the proper and efficient operation on the low quality 25 CN JP-8 fuel.

Figure 16:
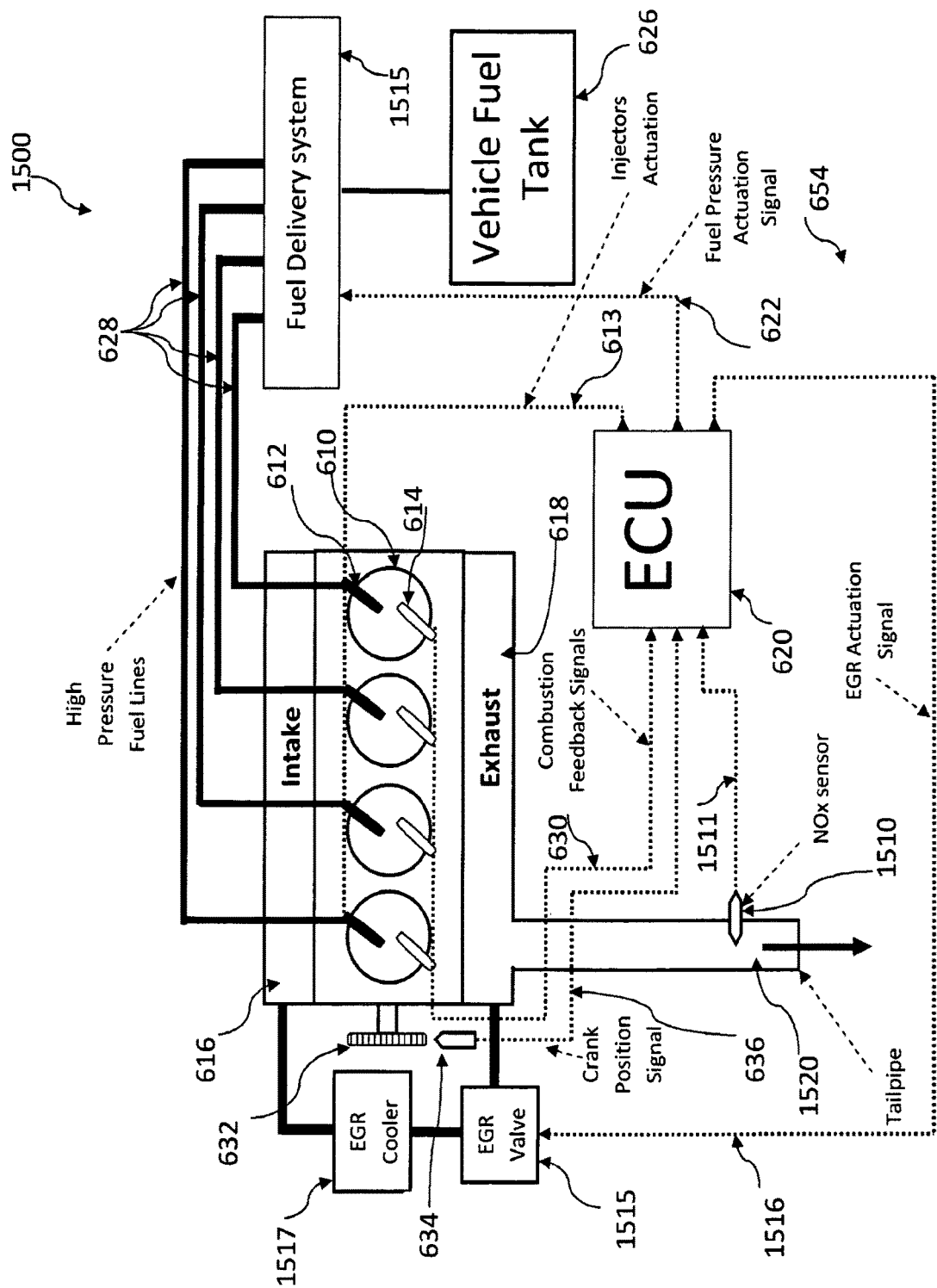
FIG. 16 is a schematic view of a multi cylinder engine having ECU that uses the described system for control the combustion and exhaust tail pipe emissions.

Now referring to FIG. 16, a schematic view of a multi-cylinder engine is provided that controls combustion in a diesel engine to minimize exhaust tail pipe emissions. An equivalent system for spark ignition engines may be developed and is clearly contemplated herein. The engine 1500 includes a plurality of cylinders 610. Each cylinder having a fuel injector 612 and a combustion feedback sensor 614. In addition, the air is provided to the cylinder through an intake manifold 616 and exhaust is removed from the cylinder from an exhaust manifold 618. An engine control unit 620 is provided to receive feedback from the engine and control the engine parameters as described with regard to the previous implementations. The electronic control unit 620 provides a fuel pressure actuation signal 622 to a fuel delivery system 1515. The fuel delivery system 1515 includes a fuel pump to draw fuel from a fuel tank 626. The fuel pressure actuation signal 622 may control the fuel pressure that is provided by the fuel delivery system to the high pressure fuel lines 628. The high pressure fuel lines 628 provide fuel to the fuel injectors 612 of each of the cylinders 610. The fuel injector 612 may also receive a signal from the electronic control unit to control the number of injection events, timing and duration of the fuel delivery into the combustion chamber. During combustion, the combustion feedback sensor 614 may provide a combustion feedback signal 630 to the electronic control unit 620. The reciprocating motion of the piston inside the cylinder 610 serves to turn the crankshaft 632. A crank position sensor 634 is configured to determine the crank position angle and provide a crank position signal 636 to the electronic control unit 620. In addition, the exhaust manifold 618 is in communication with a tail pipe 1520 to disperse the exhaust. A NOx sensor 1510 may be positioned in the tail pipe and may provide NOx signal 1511 to the electronic control unit 620. In addition, the electronic control unit 620 may provide an EGR actuation signal 1516 to an EGR valve 1515. The EGR valve 1515 may be in communication with the exhaust manifold 618 to receive exhaust. Based on the EGR actuation signal, the EGR valve may provide exhaust from the exhaust manifold 618 to an EGR cooler 1517. The EGR cooler may cool the exhaust and provide the exhaust to the intake manifold 616 after cooling. The schematic in FIG. 16 may serve as an example for implementing the described system in many internal combustion engine configurations, while operating on fuels of different physical and chemical properties.

Figure 17:
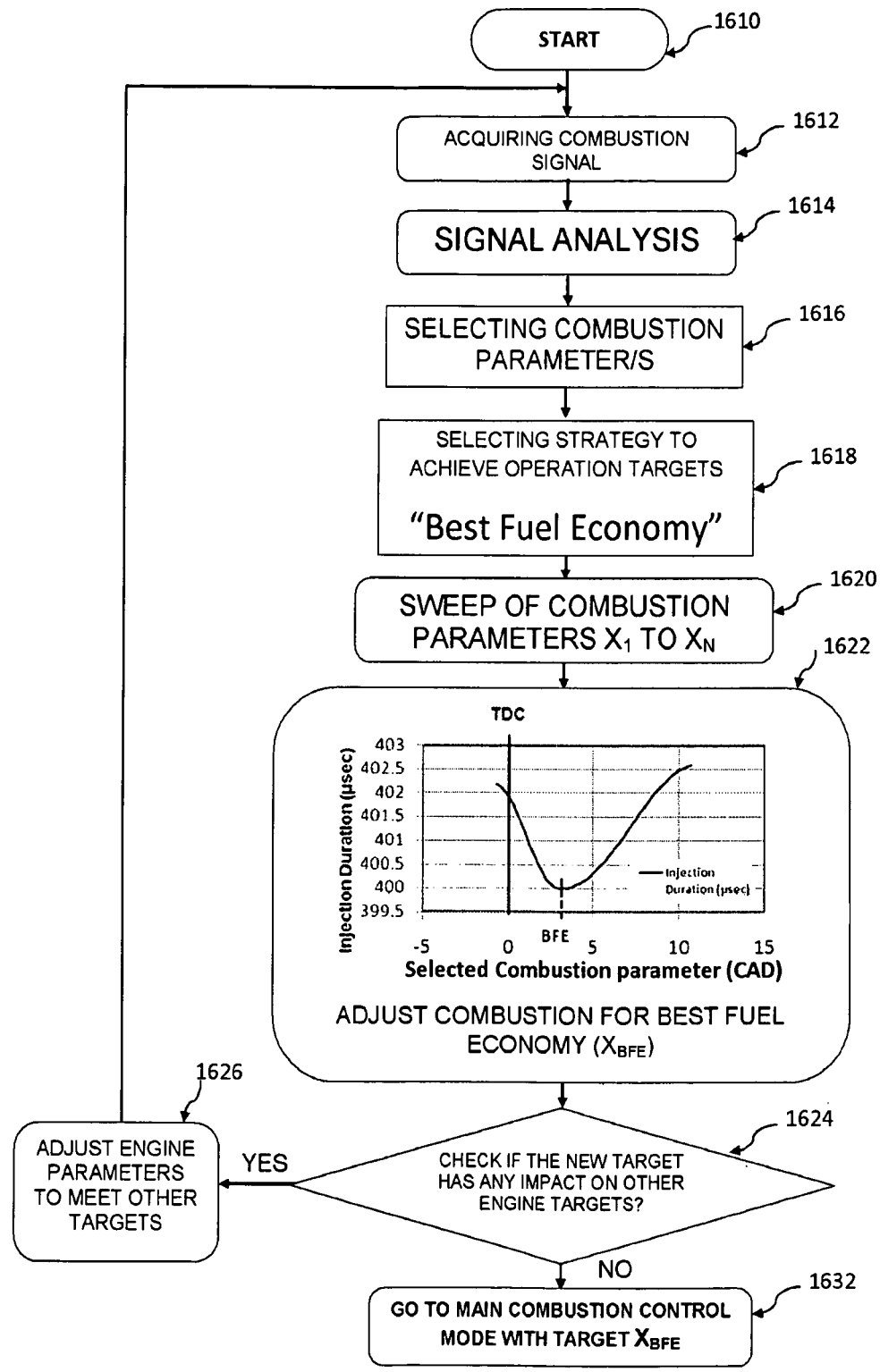
FIG. 17 is a flow chart illustrating the algorithm for best fuel economy.

Now referring to FIG. 17, a flow chart illustrating an algorithm for engine autonomous operation on a multitude of fuels with best fuel economy is provided. The method starts in block 1610 and proceeds to block 1612. In block 1612, the combustion signal is acquired. In block 1614, the combustion signal is analyzed based on the ion current parameters discussed in FIGS. 2-5 and other parameters derived from them. In block 1616, the combustion signal parameters are extracted as discussed with regard to previously mentioned combustion parameters. In block 1618, a strategy is selected to achieve the best fuel economy as previously denoted; the strategy may include determining the appropriate injection strategy, air and fuel supply strategy or other engine strategies required to meet specific targets based on the analysis of the feedback signal from the combustion chamber. In block 1620 a sweep for a selected combustion parameter is performed. For example, this may include determining the number of injection events their timings and durations. For example if the injection timing for best economy is required, the sweep tests would cover a range of injection timing and the minimum injection duration could be determined in block 1622. In block 1624, the impact of the selected injection timing for best fuel economy on other production targets for example exhaust emissions, vibration, harshness and noise is determined. If other targets are not met, the ECU determines the optimum settings, through block 1626, and the loop is repeated to achieve best fuel economy targets, while meeting the other targets. If all goals and targets are met, the system proceeds to block 1632 where the system exit the best fuel economy loop, back to the main combustion control mode, where the new settings is adapted denoted as $X_{BFE}$ (Settings for Best Fuel Economy).

Figure 18:
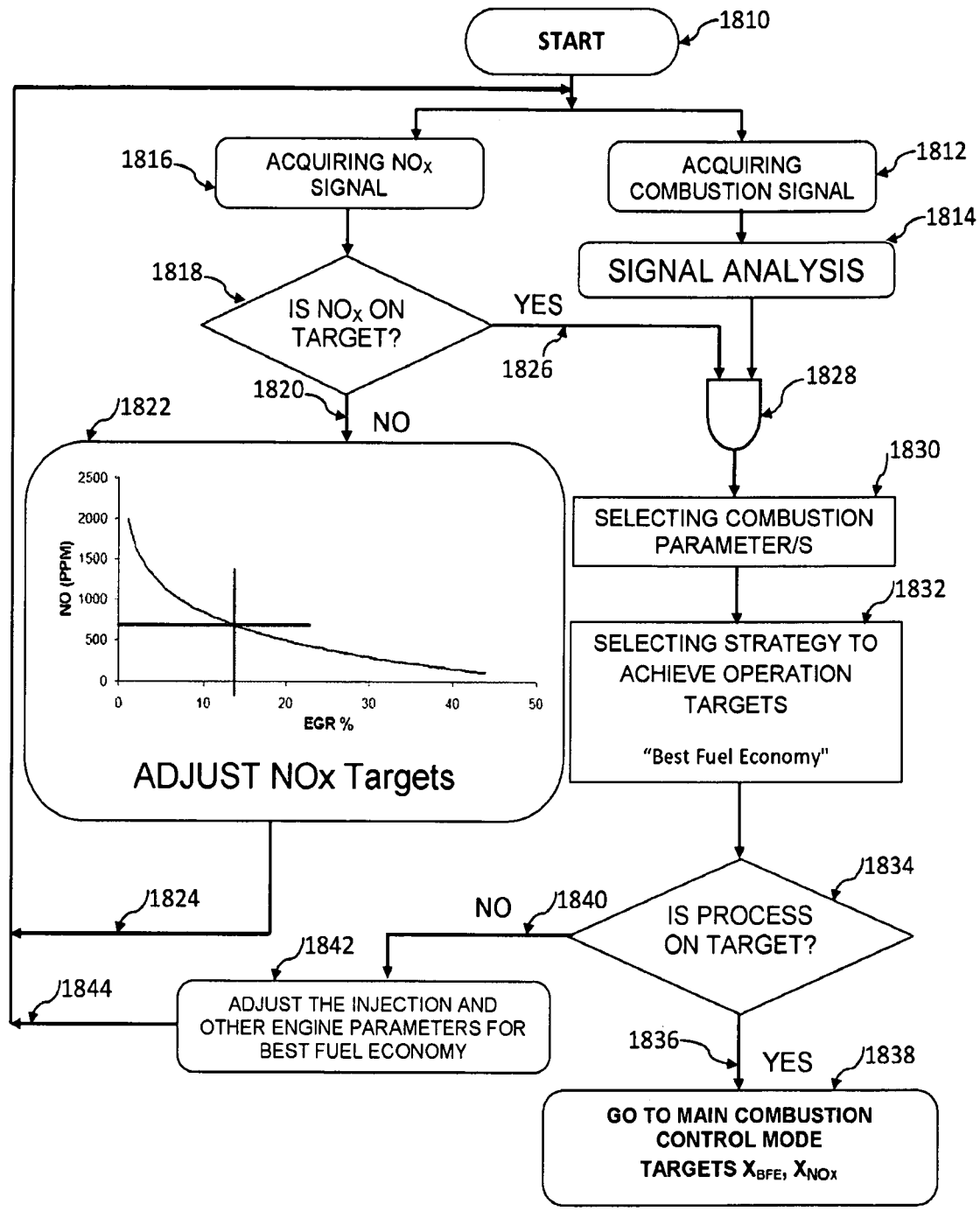
FIG. 18 is a flow chart illustrating the algorithm for control of the combustion for best fuel economy and certain 5$NO_X$ target.

Now referring to FIG. 18, a flow chart illustrating an algorithm for engine autonomous operation on a multitude of fuels to control combustion for the best fuel economy and certain NOx targets is provided. The method starts in block 1810. In block 1812, the ion current signal is acquired. In block 1814, the ion current signal is analyzed to determine the combustion parameters. In block 1816, a NOx signal is acquired. In block 1818, it is determined whether the NOx emissions are on target. If the NOx emissions are not on target, the method follows line 1820 to block 1822 where EGR valve or other engine parameters may be adjusted to reduce NOx to meet the target. The process then follows line 1824 to block 1810 where the process repeats. If the NOx is on target in block 1818, the process follows line 1826 to block 1828. In block 1828 is AND logic that insures that both inputs are provided before proceeding further, the process then proceeds to block 1830. In block 1830, the combustion parameters are selected. In block 1832, a strategy is selected to achieve the operational targets for best fuel economy. In block 1834, it is determined whether the process is on target for the best fuel economy. If the process is on target for the best fuel economy, the process follows line 1836 to block 1838 where the system proceeds to the normal combustion control mode adapting the new settings computed from the herein loop. If the process is not on target in block 1834, the process follows 1840 to block 1842 where the engine parameters are adjusted for best fuel economy and the process follows line 1844 back to block 1810 where the process is repeated. This schematic represents an example for a control strategy that can be used to improve the engine control unit to meet certain requirements under any fuel supplied to the engine.

Figure 19:
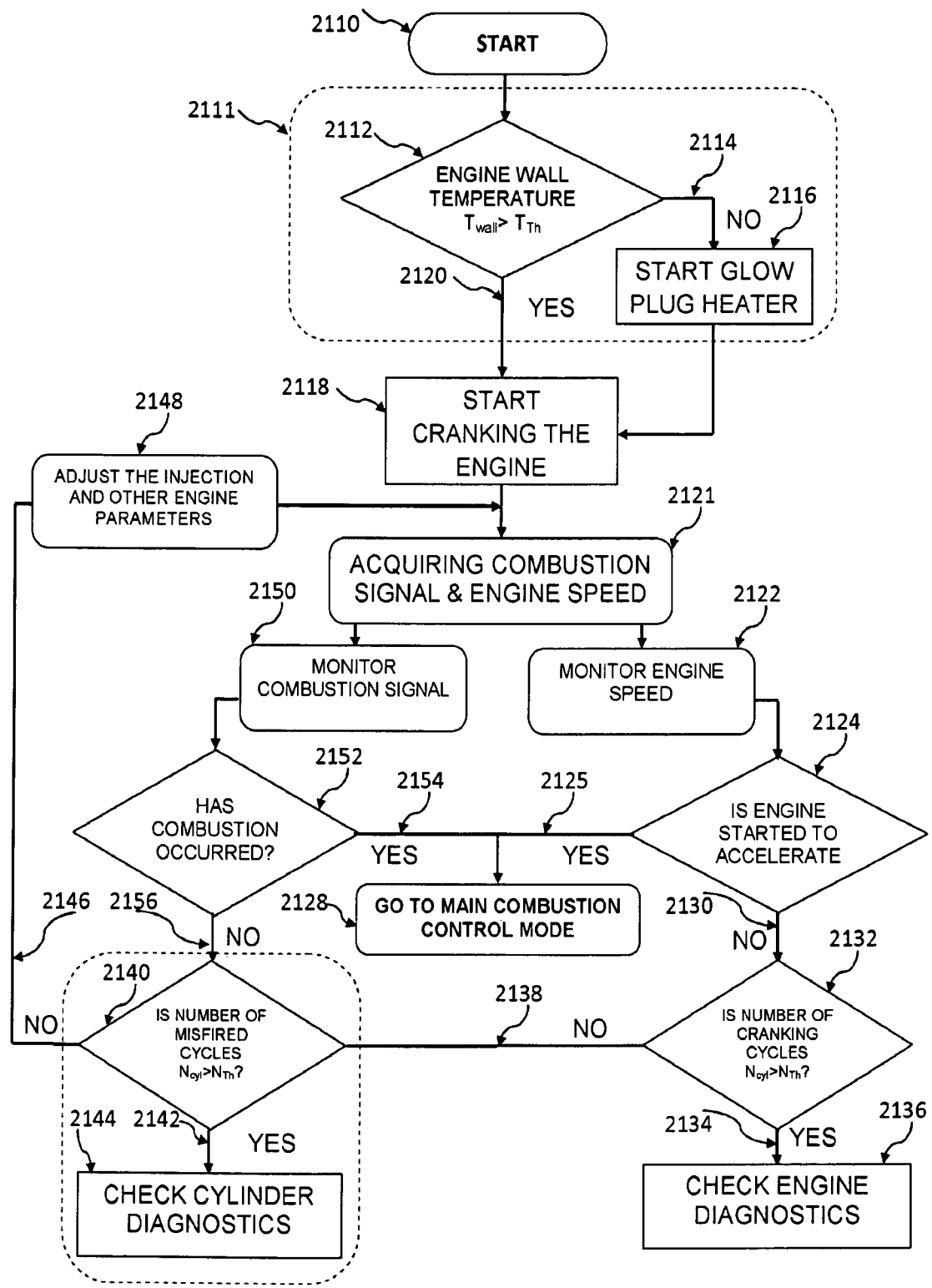
FIG. 19 is a flow chart illustrating the algorithm for cold start using the combustion signal to facilitate the engine starting using multitude of fuels.

Now referring to FIG. 19, a cold start strategy is provided. The method starts in block 2110. In block 2112, the system determines if the engine wall temperature is higher than a threshold temperature to give an OK status to start the engine cranking procedure. If the engine wall temperature is not higher than the threshold temperature, the method follows line 2114 to block 2116 for an advisable step of preheating the combustion chamber 2116 by energizing a glow plug or and other starting aid. The starting aid may be an intake air electric heater, a fuel burner, a starting fuel or any other device. Block 2111 is considered as an optional block if a glow plug or another starting aid is available. In block 2116, the system starts the glow plug heater or another starting aid to raise the temperature of the charge. The preheating procedure may be optional. The system then proceeds to block 2118. If the engine wall temperature is greater than the threshold temperature in block 2112, the method follows line 2120 to block 2118. In block 2118, engine cranking is started. The process then proceeds to block 2121. In block 2121, the combustion signal and the engine speed are acquired. In block 2122, the engine speed is monitored; simultaneously the combustion signal is monitored in block 2150. The method then proceeds to block 2124 where the system determines if the engine has started to accelerate. If the engine has started to accelerate, the method proceeds along line 2125 to block 2128. In block 2128, the method switches to a normal combustion control mode. If the engine has not started to accelerate, the method follows line 2130 to block 2132. In block 2132, the system determines if the number of cranking cycles is greater than a threshold number of cranking cycles. If the number of cranking cycles is greater than the threshold number of cranking cycles, then the method follows line 2134 to block 2136 where the engines should be checked by an operator. If the number of cranking cycles is not greater than the threshold number of cycles in block 2132, the method follows block 2138 to block 2140. In the same time, the combustion signal may be monitored in block 2150 simultaneously with the engine speed being monitored in block 2122. The method proceeds from block 2150 to block 2152. In block 2152, the system determines if combustion has occurred. If combustion has occurred, the method follows line 2154 to block 2128 where the method is switched to a normal combustion control mode. If combustion has not occurred in block 2152, the method follows line 2156 to block 2140 where the number of misfired cycles is compared to a threshold number of misfired cycles and the method continues as previously described. The method can use the combustion feedback signal, engine speed signal or both to assist cold starting the engine. In block 2140, the system determines if the number of misfired cycles is greater than a threshold number of misfired cycles. If the number of misfired cycles is greater than the threshold number of misfired cycles, the method follows line 2142 to block 2144 where the cylinder diagnostics need to be checked. If the number of misfired cycles is not greater than the threshold number of misfired cycles in block 2140, then the method follows line 2146 to block 2148. In block 2148, the engine parameters for example, the injection parameters or strategies, are adjusted and the method repeats at block 2120.

Figure 20:
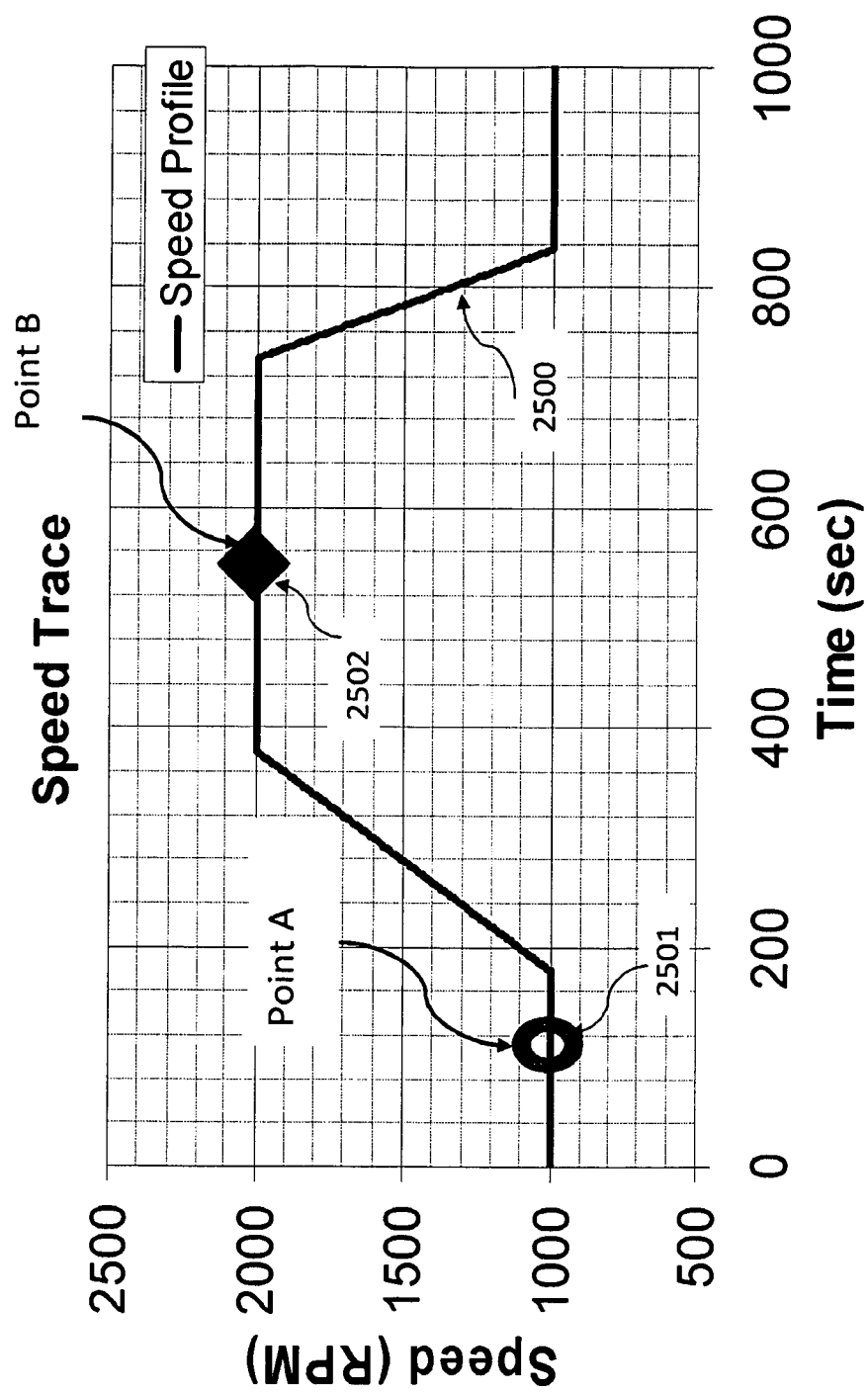
FIG. 20 is graphical representation of engine speed during transient operation.

Now referring to FIG. 20, a graphical illustration of transient operation for an engine acceleration and deceleration. This graph serves to illustrate the advantage of the described system over other systems, and serves to understand the engine performance under transient conditions. The engine will run at low speed of 1000 RPM. Then, it will accelerate to reach 2000 RPM. After that, the engine stays at constant speed of 2000 RPM, and finally, it decelerates back to 1000 RPM. Two points from the speed curve 2500 are picked from the recorded data to be analyzed. Point A at 1000 RPM denoted by 2501, and point B at 2000 RPM denoted by 2502. Both points A and B will be shown in the next figures using the described system and other systems. Also, both points will be shown for different fuels used.

Figure 21:
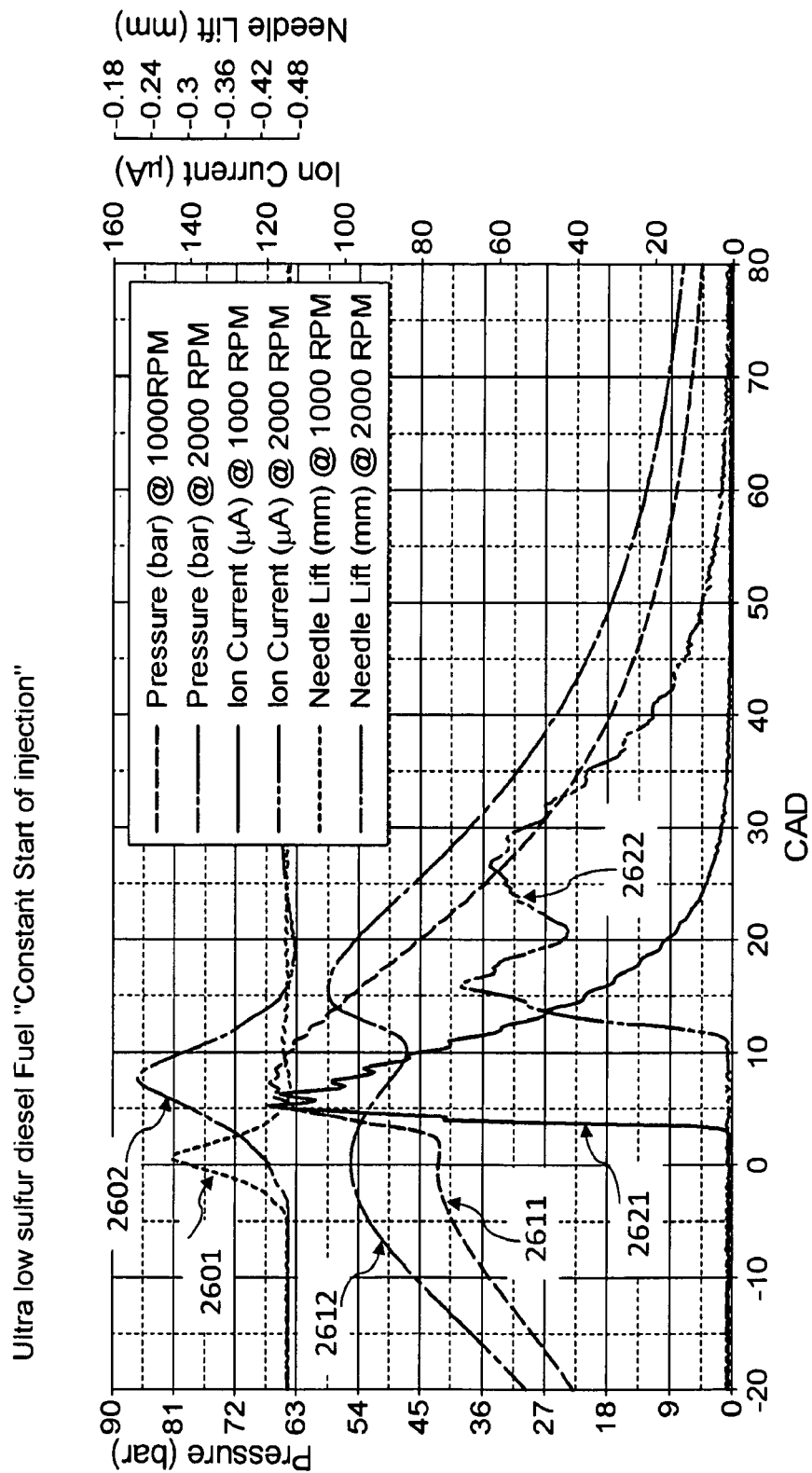
FIG. 21 is a graphical representation of the cylinder gas pressure, needle lift and ion current traces versus crank angle degrees for different engine speeds at a constant start of injection using ULSD fuel.

Now referring to FIG. 21, a graphical representation of cylinder gas pressure and ion current traces is provided with respect to crank angle degrees that represents the prior art, where the start of injection can be constant or determined from a look up table based on engine speed and load. In this graph, the start of injection was kept constant at −5° deg. The fuel used in this condition is the 47 CN ULSD fuel. Line 2611 indicates the cylinder gas pressure at engine speed of 1000 RPM marked as Point A in FIG. 20, and Line 2612 indicated the cylinder gas pressure at engine speed of 2000 RPM marked as point B in FIG. 20. The increase in the compression pressure in line 2612 can be mainly contributed to the turbocharger that increases the intake pressure at higher engine speeds. Line 2601 and 2602 indicate the needle lift signal of point A and point B respectively. The start of injection was the same for both conditions but the duration for the fuel injected is longer for point B because of the high speed at 2000 RPM. The increase in engine speed caused retardation in the start of combustion which can be compared in the ion current traces between point A denoted by line 2621 and point B denoted by line 2622. Also, the combustion quality monitored through the ion current signal can be characterized using the parameters in FIG. 2-5.

Figure 22:
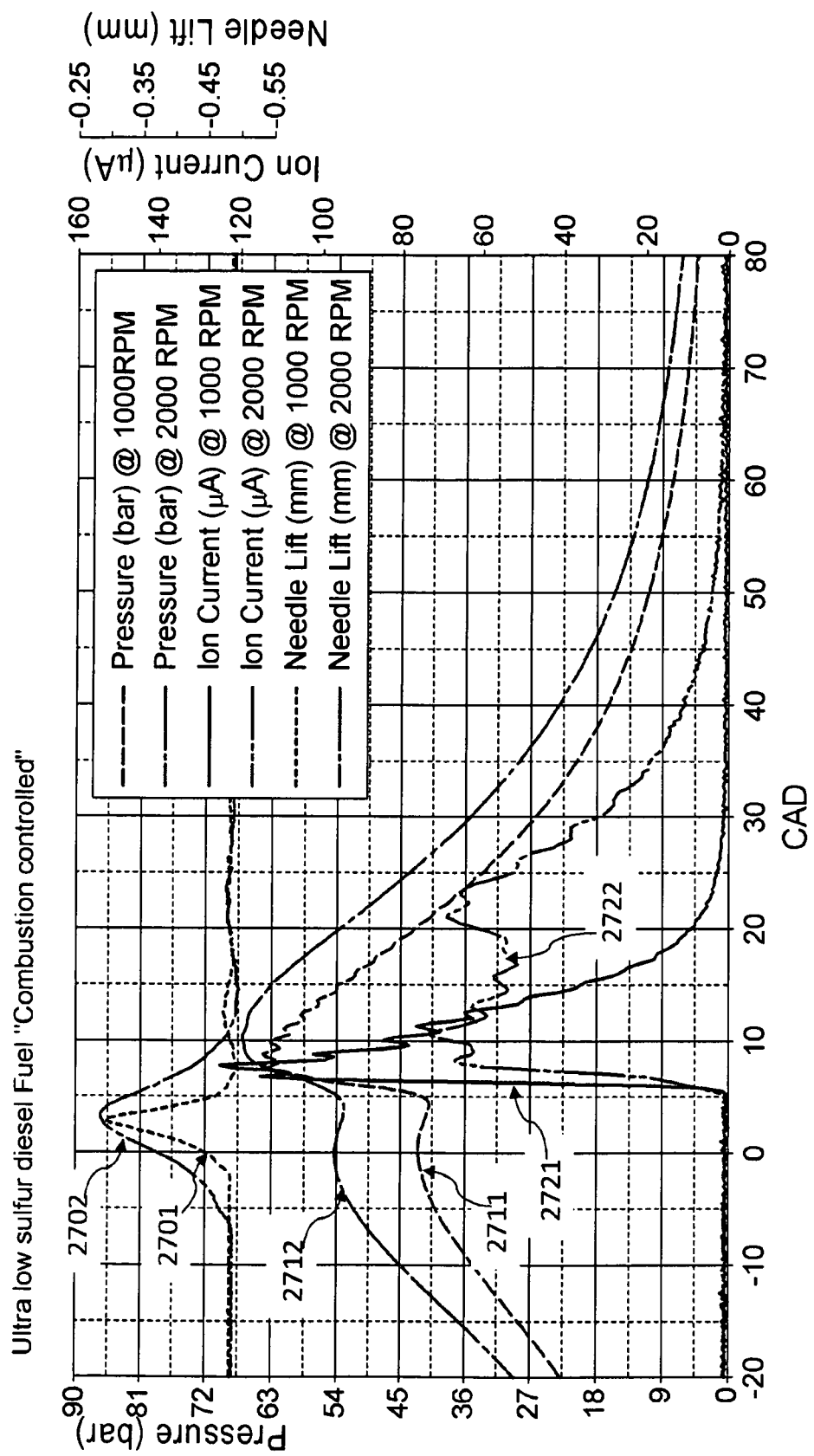
FIG. 22 is a graphical representation of the -cylinder gas pressure, needle lift and ion current versus crank angle degrees for different engine speeds at constant combustion phasing using ULSD I fuel by applying the current invention.

Now referring to FIG. 22, a graphical representation of cylinder gas pressure and ion current traces is provided with respect to crank angle degrees that represents the present invention, where the start of combustion can be controlled regardless of engine speed and load. In this graph, the combustion phasing was kept constant at 5.5° deg. The fuel used in this condition is the 47 CN ULSD fuel. Line 2711 indicates the cylinder gas pressure at engine speed of 1000 RPM marked as Point A in FIG. 20, and Line 2712 indicated the cylinder gas pressure at engine speed of 2000 RPM marked as point B in FIG. 20. The increase in the compression pressure in line 2712 can be mainly contributed to the turbocharger that increases the intake pressure at higher engine speeds. Line 2701 and 2702 indicate the needle lift signal of point A and point B respectively, where the start of injection was altered by the combustion controller based on the feedback from the combustion sensor. The start of injection was advanced, and the fuel injected was longer for point B because of the high speed at 2000 RPM. The combustion phasing at the two speeds is kept the same by the current invention as can be shown by line 2721 at 1000 RPM, for point A and by line 2722 at 2000 RPM for point B.

Figure 23:
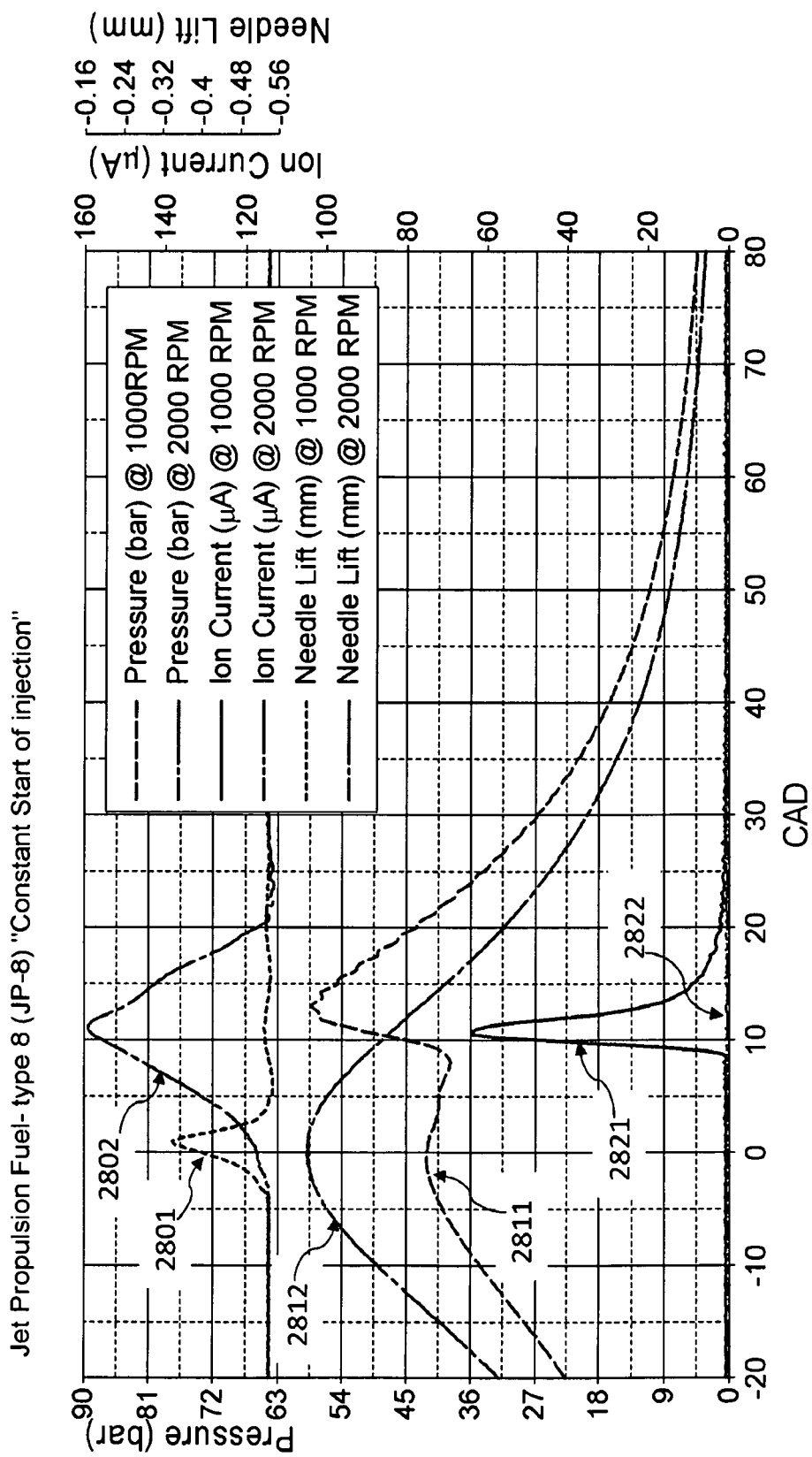
FIG. 23 is a graphical representation of the cylinder pressure, needle lift and ion current traces versus crank angle degrees for different engine speeds at a constant start of injection using a 25 CN JP-8 aviation fuel.

Now referring to FIG. 23, a graphical representation of cylinder gas pressure and ion current traces is provided with respect to crank angle degrees that represents other systems, where the start of injection can be kept constant or determined from a look up table based on engine speed and load. In this graph, the start of injection was kept constant at −5° deg. The fuel used in this case is the 25 CN JP-8 fuel. Line 2811 indicates the cylinder gas pressure at engine speed of 1000 RPM marked as Point A in FIG. 20, and Line 2812 indicated the cylinder pressure at engine speed of 2000 RPM marked as point B in FIG. 20. The increase in the compression pressure in line 2812 can be mainly contributed to the turbocharger that increases the intake pressure at higher engine speeds. Line 2801 and 2802 indicate the needle lift signal of point A and point B respectively. The start of injection was the same for both conditions but the duration for the fuel injected is longer for point B because of the high speed at 2000 RPM. The increase in engine speed caused almost a complete miss fire recorded in the pressure trace 2812 and the ion current signal 2822. The fuel was able to combust in point A at 1000 RPM with a longer ignition delay compared to ULSD in FIG. 21. However, it failed to combust due to the increase in engine speed in point B at 2000 RPM as the ignition delay is too long. This figure shows clearly the inability of other systems in enabling the engine to operate on a fuel that has different properties than the conventional ULSD fuel.

Figure 24:
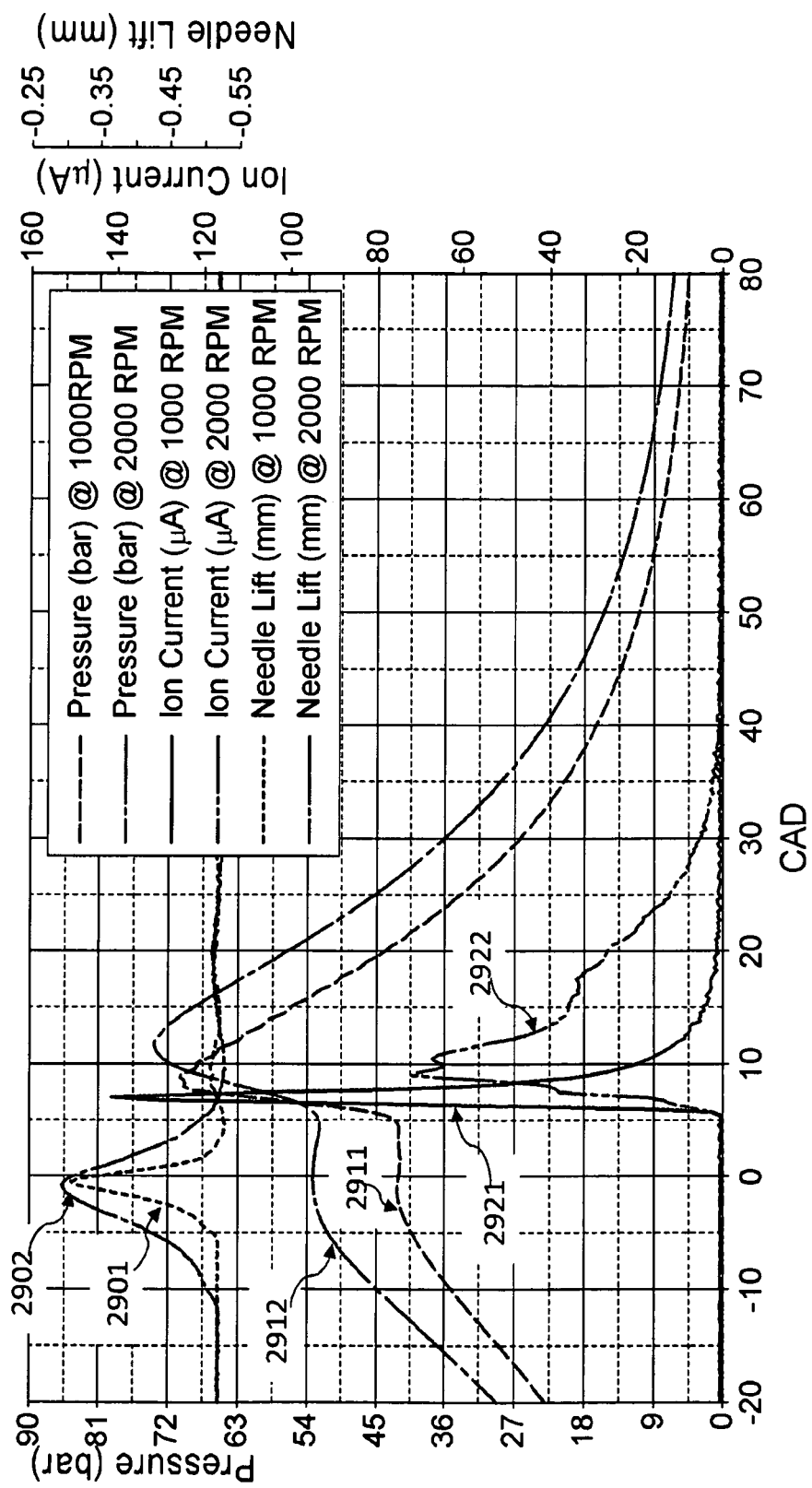
FIG. 24 is a graphical representation of the -cylinder gas pressure, needle lift and ion current traces versus crank angle degrees for different engine speeds at constant combustion phasing using a 25 CN JP-8 aviation fuel by applying the current invention.

Now referring to FIG. 24, a graphical representation of cylinder gas pressure and ion current traces is provided with respect to crank angle degrees that represents the described system, where the start of combustion can be controlled regardless of engine speed and load. In this graph, the combustion phasing was kept constant at 5.5° deg. The fuel used in this condition is the 25 CN JP-8. Line 2911 indicates the cylinder gas pressure at engine speed of 1000 RPM marked as Point A in FIG. 20, and Line 2912 indicates the cylinder gas pressure at an engine speed of 2000 RPM marked as point B in FIG. 20. The increase in the compression pressure in line 2912 can be contributed to the turbocharger that increases the intake pressure at higher engine speeds. Line 2901 and 2902 indicate the needle lift signals of point A and point B respectively, where the start of injection was altered by the combustion controller based on the feedback from the combustion sensor. The start of injection was advanced, and the fuel injected was longer for point B because of the high speed at 2000 RPM. Since the feedback from the combustion sensor updates the controller to self-adjust, the combustion phasing was maintained at 5.5° deg. This can be seen the ion current signals 2921 and 2922 and the cylinder gas pressures 2911 and 2912 for point A and point B respectively. This graph demonstrates the ability of the described system to autonomously re-adjust the engine parameters and enable it to operate properly and efficiently on fuels with different physical and chemical properties.

Figure 25:
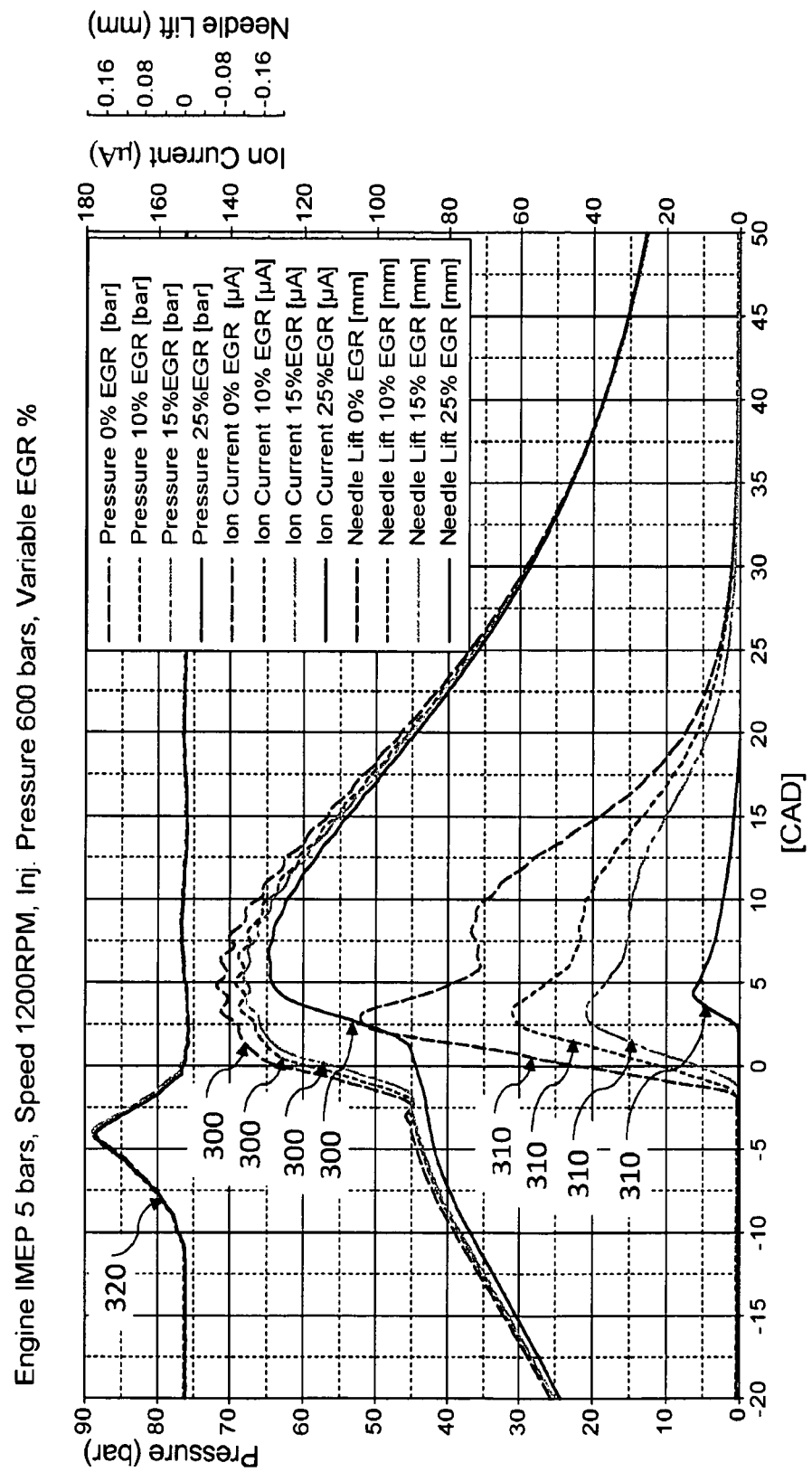
FIG. 25 is a graphical representation of the cylinder gas pressure, needle lift and ion current traces versus crank angle degrees for different exhaust gases recirculation percentages under steady state operation at constant start of injection.

Now referring to FIG. 25, a graphical representation of cylinder gas pressure and ion current traces is provided with respect to crank angle degrees at different EGR percentages with the engine operating on ULSD fuel. Line 3000, 3001, 3002, and 3003 are cylinder gas pressure traces that correspond to EGR percentages of 0, 10, 15, 25% respectively. Similarly, Lines 3100, 3101, 3102, and 3103 are ion current traces at the different EGR percentages. Higher EGR percentages increase the ignition delay as can be seen in the ion current and cylinder gas pressure traces, while the start of injection was the same as shown by line 3200. Increasing the EGR percentage caused a drop in the peak cylinder gas pressure as well as a drop in the ion current amplitude. The parameters used to identify the characteristics of combustion developed from multitude of fuels explained in FIGS. 2-5 can be used under different EGR percentages. The ability of the system in controlling the engine at different EGR percentages is further demonstrated in next two figures.

Figure 26:
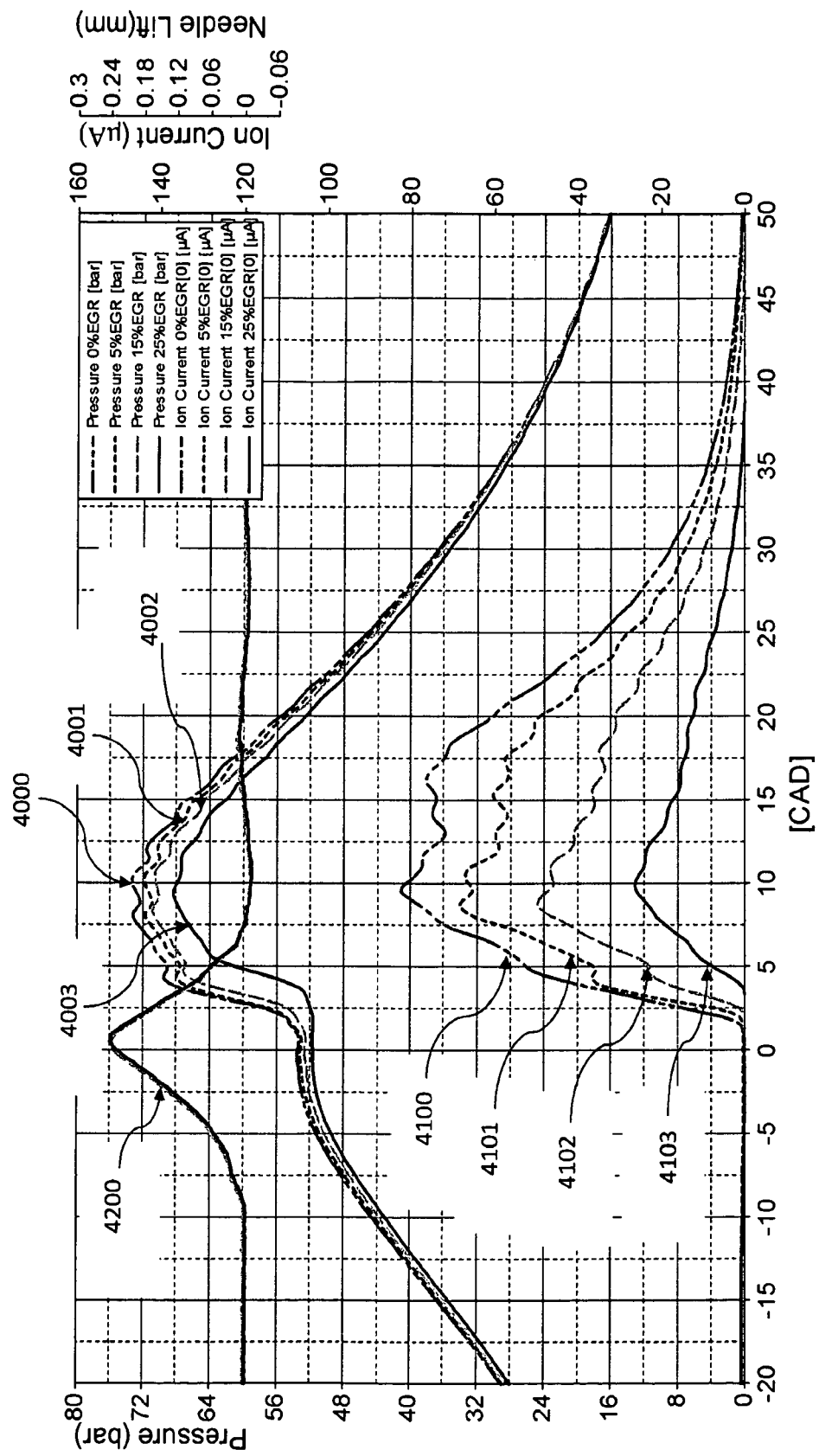
FIG. 26 is a graphical representation of the cylinder gas pressure, needle lift and ion current traces versus crank angle degrees for different exhaust gases recirculation percentages under steady state operation at constant start of injection using ULSD fuel.

Now referring to FIG. 26, a graphical representation of cylinder gas pressure and ion current traces is provided with respect to crank angle degrees, with the engine operating on ULSD fuel at a speed and load different than the conditions of FIG. 25. This figure represents the effect of EGR on the combustion process at constant start of injection. Line 4000, 4001, 4002, and 4003 are cylinder gas pressure traces that correspond to EGR percentages of 0, 5, 15, 25% respectively. Similarly, Lines 4100, 4101, 4102, and 4103 are ion current traces at the different EGR percentages. The increase in the EGR percentage increase the ignition delay which can be seen in the ion current and pressure traces, while the start of injection was kept the same for all EGR rates as denoted by line 4200. Increasing the EGR percentage caused a drop in the peak cylinder gas pressure as well as a drop in the ion current amplitude.

Figure 27:
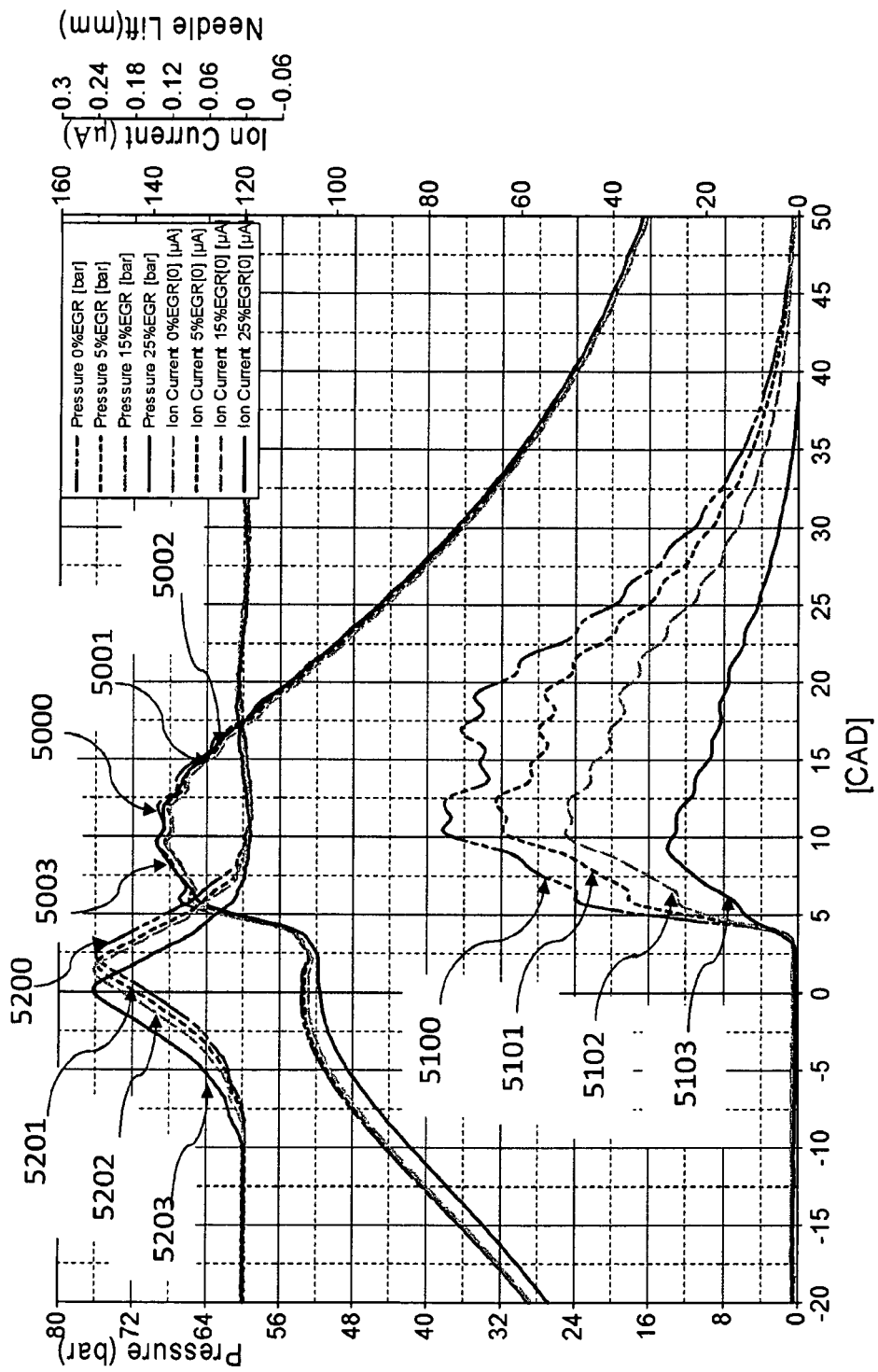
FIG. 27 is a graphical representation of the cylinder gas pressure, needle lift and ion current traces versus crank angle degrees for different exhaust gases recirculation percentages under steady state operation at constant combustion phasing using ULSD fuel by applying the described system.

Now referring to FIG. 27, a graphical representation of cylinder gas pressure and ion current traces is provided with respect to crank angle degree. This figure shows the effect of EGR on the combustion process while applying the technology described in this application. Line 5000, 5001, 5002, and 5003 are cylinder gas pressure traces that correspond to EGR percentages of 0, 5, 15, and 25% respectively. Similarly, Lines 5100, 5101, 5102, and 5103 are ion current traces at the different EGR percentages. While higher EGR percentages increased the ignition delay, the combustion controller readjusted and advanced the injection timing to keep the combustion phasing constant as shown in the ion current and cylinder gas pressure traces. Advancing the start of injection at higher EGR rates can be seen in the needle lift traces denoted by line 5200, 5201, 5202, and 5203 respectively.

As a person skilled in the art will readily appreciate, the above description is meant as an illustration of the principles of this application. This description is not intended to limit the scope or application of this system in that the invention is susceptible to modification, variation and change, without departing from the spirit of this application, as defined in the following claims.

We claim:

1. A system for controlling an internal combustion engine, the system comprising:
   a first sensor for receiving engine combustion data, the first sensor comprising an ion current sensor and the combustion data comprising an ion current signal;
   a second sensor comprising a NOx sensor and generating NOx signal; and
   a control unit in communication with the sensor, the control unit is configured to control engine operating parameters based on real-time processing cycle by cycle of the ion current signal;
   wherein control unit is configured to control engine operating parameters autonomously on variety of fuels or their blends independent of the air/fuel ratio operation mode to meet torque demands at the best fuel economy;
   wherein the control unit enables autonomous operation of electronically controlled internal combustion engines and account for variabilities in ambient conditions including humidity, temperature and pressure; and
   wherein the control unit being configured to control injection parameters according to a first feedback loop in response to the NOx signal and control injection parameters according to a second feedback loop in response to the ion current signal.

2. The system of claim 1, wherein the control unit adjusts the engine operating parameters based on at least one engine combustion parameter, the at least one engine combustion parameter including at least one of a start of combustion by the start of ion current, ignition delay indicated by difference between the start of injection and start of ion current, location of first peak of the ion current signal, location of the second peak of the ion current, location the of the peak of the derivative of the ion current signal leading to the first peak, location of the peak of the derivative leading to the second peak of the ion current signal.

3. The system of claim 1, further comprising a cylinder gas pressure sensor.

4. The system of claim 3, wherein the control unit adjusts the engine operating parameters based on at least one engine combustion parameter, the at least one engine combustion parameter including at least one of a start of pressure rise due to combustion, location of the peak rate of pressure rise, magnitude of peak rate of pressure rise due to combustion, peak pressure location and peak pressure magnitude.

5. The system of claim 3, wherein a rate of heat release is calculated from cylinder gas pressure sensor, where the control unit adjusts the engine operating parameters based on at least one rate of heat release parameter, the rate of heat release parameters including start of rate of heat release, location of the peak of the premixed combustion fraction, magnitude of the peak of the premixed combustion fraction, location of the peak of the mixing controlled diffusion combustion, magnitude of the peak of the mixing controlled diffusion combustion fraction, integrated premixed combustion, integrated mixing controlled diffusion combustion fraction, and location of a percentage of the mass burned and slopes of different parts of the rate of heat release trace.

6. The system of claim 5, wherein the engine operating parameters are controlled based on a combination of the rate of heat release parameters and the cylinder gas pressure.

7. The system of claim 1, further comprising an optical sensor.

8. The system of claim 7, wherein the control unit adjusts the engine operating parameters based on at least one engine combustion parameter, the at least one engine combustion parameter including at least one of a start of combustion, combustion phasing, and other combustion parameters that are related to gaseous and particulate emissions.

9. The system of claim 1, wherein the control unit adjusts the amount of fuel injected based on the combustion data.

10. The system of claim 1, wherein the control unit adjusts the timing of the fuel injection relative to the crank angle based on the combustion data.

11. The system of claim 1, wherein the control unit adjusts the number of injection events.

12. The system of claim 1, wherein the control unit adjusts the timing of the injection events.

13. The system of claim 1, wherein the control unit adjusts the number of sparks of the spark plug in spark ignition engine, sparks events may be controlled through number of spark events, the duration of spark events, and the timing of spark events.

14. The system of claim 1, wherein the control unit can control different engine parameters including at least one of fuel system parameters, air system parameters, turbo-charging and supercharging system parameters, valve train systems, EGR (exhaust gases recirculation) system parameters, and after-treatment system parameters.

15. The system of claim 1, wherein the sensor is a ion current sensor integrated with a glow plug or fuel injector.

16. The system of claim 1, further comprising a pressure sensor integrated with a glow plug.

17. The system of claim 1, wherein the control unit enables autonomous operation of electronically controlled internal combustion engines and account for variabilities due to manufacturing and production tolerances.

18. The system of claim 1, wherein the control unit enables autonomous operation of electronically controlled internal combustion engines and account for variabilities due to component drift and aging.

19. The system of claim 1, wherein the control unit of electronically controlled internal combustion engines can operate autonomously at variable speeds and loads under different steady state and transient operating modes.

20. The system of claim 1, wherein the sensor can be used for onboard diagnostics of engine performance under different operating modes.

21. The system of claim 1, wherein control unit is configured to control engine operating parameters to control a NOx output level in response to the NOx signal when the NOx output level is above a target NOx level and control a fuel economy in response to the ion current signal and the NOx signal when the NOx output level is below a target NOx level.

22. A system for controlling an internal combustion engine, the system comprising:
   an ion current sensor receiving engine combustion data in the form of ion current measurements;
   a NOx sensor configured to generate a NOx signal; and
   a control unit in communication with the sensor for receiving the engine combustion data and with the NOx sensor for receiving the NOx signal, the control unit being configured to control engine operating parameters based on real-time processing cycle by cycle of the ion current measurements, wherein the control unit enables autonomous operation of electronically controlled internal combustion engines on a plurality of fuels, by determining that a type of fuel provided to the internal combustion engine has changed in response to the ion current sensor;
   wherein the fuels include at least two of conventional available diesel fuel, alternate fuels derived from petroleum, bio-fuels, alternative fuels, synthetic fuels, renewable fuels, or their blends;
   wherein the control unit enables autonomous operation of electronically controlled internal combustion engines and account for variabilities in ambient conditions including humidity, temperature and pressure; and
   wherein the control unit is configured to control injection parameters according to a first feedback loop in response to the NOx signal and control injection parameters according to a second feedback loop in response to the ion current measurements.

23. The system of claim 22, wherein the fuels include liquid or gas such as gasoline, diesel, ethanol, natural gas, or hydrogen.

24. The system of claim 22, wherein the control unit improves engine operation and performance on conventional fuels that have patch to patch variation, station to station variation or ageing variation.

25. A method for controlling an internal combustion engine, the method comprising:
   receiving engine combustion data comprising an ion current signal from an ion current sensor;
   receiving a NOx signal from a NOx sensor;
   controlling engine injection timing, an amount of fuel injected, or a number of injection events executed in response to real-time processing cycle by cycle at least one of a start of ion current, location of first peak of the ion current signal, location of the second peak of the ion current, location the of the peak of the derivative of the ion current signal leading to the first peak, location of the peak of the derivative leading to the second peak of the ion current signal to meet torque demand with the best fuel economy; and
   controlling injection parameters according to a first feedback loop in response to the NOx signal and controlling injection parameters according to a second feedback loop in response to the ion current signal;
   wherein the control unit enables autonomous operation of electronically controlled internal combustion engines and account for variabilities in ambient conditions including humidity, temperature and pressure.

* * * * *